United States Patent
Muscolino et al.

(10) Patent No.: US 12,223,562 B2
(45) Date of Patent: Feb. 11, 2025

(54) ORGANIZING A GRAPHIC DESIGN DOCUMENT USING SEMANTIC LAYERS

(71) Applicant: Adobe Inc., San Jose, CA (US)

(72) Inventors: Gregory Cy Muscolino, Novato, CA (US); Christian Cantrell, Sterling, VA (US); Archie Samuel Bagnall, Irvine, CA (US); Christopher James Gammon, Waunakee, WI (US); Patrick James Hebron, Briarcliff Manor, NY (US)

(73) Assignee: Adobe Inc., San Jose, CA (US)

( * ) Notice: Subject to any disclaimer, the term of this patent is extended or adjusted under 35 U.S.C. 154(b) by 196 days.

(21) Appl. No.: 17/586,613

(22) Filed: Jan. 27, 2022

(65) Prior Publication Data
US 2023/0237708 A1    Jul. 27, 2023

(51) Int. Cl.
*G06T 11/00* (2006.01)
*G06F 3/0481* (2022.01)
*G06F 3/04842* (2022.01)

(52) U.S. Cl.
CPC ........... *G06T 11/00* (2013.01); *G06F 3/0481* (2013.01); *G06F 3/04842* (2013.01); *G06T 2200/24* (2013.01)

(58) Field of Classification Search
None
See application file for complete search history.

(56) References Cited
U.S. PATENT DOCUMENTS

| | | | |
|---|---|---|---|
| 7,499,058 B2 | 3/2009 | Van et al. | |
| 7,724,242 B2 | 5/2010 | Hillis et al. | |
| 8,180,754 B1 * | 5/2012 | Ershov | G06F 16/9535 707/706 |
| 10,198,674 B2 | 2/2019 | Koziarz et al. | |
| 10,216,356 B2 | 2/2019 | Noda et al. | |
| 10,614,156 B1 | 4/2020 | Stansell et al. | |
| 11,126,340 B2 | 9/2021 | Hameed et al. | |
| 11,138,775 B1 | 10/2021 | Rosser | |
| 2002/0122596 A1 * | 9/2002 | Bradshaw | G06F 16/5838 707/E17.023 |
| 2006/0063518 A1 | 3/2006 | Paddon et al. | |
| 2006/0125799 A1 | 6/2006 | Hillis et al. | |
| 2010/0082661 A1 | 4/2010 | Beaudreau | |

(Continued)

FOREIGN PATENT DOCUMENTS

WO    WO-2020180524 A1 *    9/2020    ......... G06F 16/9558

OTHER PUBLICATIONS

Strong et al., "Similarity-based Image Organization and Browsing using Multi-Resolution Self-Organizing Map", (Year: 2011).*

(Continued)

*Primary Examiner* — Hilina K Demeter
(74) *Attorney, Agent, or Firm* — NICHOLSON DE VOS WEBSTER & ELLIOTT LLP

(57) ABSTRACT

Embodiments are disclosed for semantically organizing a graphic design document. A method of semantically organizing a graphic design document can include obtaining a document, identifying a plurality of layers associated with the document, determining a plurality of semantic labels associated with the plurality of layers, determining a semantic layer hierarchy of the plurality of layers, and organizing the plurality of layers based at least on the semantic layer hierarchy.

20 Claims, 23 Drawing Sheets

(56) References Cited

U.S. PATENT DOCUMENTS

| | | | |
|---|---|---|---|
| 2011/0264768 A1 | 10/2011 | Walker et al. | |
| 2013/0198613 A1* | 8/2013 | Scoda | G06F 40/154 |
| | | | 715/239 |
| 2015/0093029 A1* | 4/2015 | Tijssen | G06T 11/00 |
| | | | 382/173 |
| 2015/0189338 A1 | 7/2015 | Lam et al. | |
| 2015/0220492 A1 | 8/2015 | Simeonov et al. | |
| 2015/0346981 A1 | 12/2015 | Johnson et al. | |
| 2016/0062961 A1 | 3/2016 | Zhu et al. | |
| 2017/0249775 A1* | 8/2017 | Baillard | G06T 15/02 |
| 2018/0121768 A1* | 5/2018 | Lin | G06V 10/454 |
| 2019/0065991 A1* | 2/2019 | Guggilla | G06N 20/00 |
| 2019/0354793 A1* | 11/2019 | Biswas | G06T 7/593 |
| 2019/0370587 A1* | 12/2019 | Burachas | G06T 11/60 |
| 2020/0193556 A1 | 6/2020 | Jin et al. | |
| 2020/0242771 A1 | 7/2020 | Park et al. | |
| 2020/0264766 A1 | 8/2020 | Hameed et al. | |
| 2020/0372695 A1 | 11/2020 | Beri et al. | |
| 2020/0394267 A1* | 12/2020 | Mwarabu | G06N 20/00 |
| 2021/0112176 A1 | 4/2021 | Gopalakrishnan et al. | |
| 2022/0180602 A1 | 6/2022 | Hao et al. | |
| 2023/0127460 A1* | 4/2023 | Xie | G06F 3/04842 |
| | | | 715/764 |
| 2023/0142052 A1 | 5/2023 | Asgekar et al. | |
| 2023/0237192 A1 | 7/2023 | Kahan et al. | |
| 2023/0237717 A1 | 7/2023 | Gregory et al. | |
| 2023/0237719 A1 | 7/2023 | Gregory et al. | |
| 2023/0401324 A1 | 12/2023 | Freundlich et al. | |

OTHER PUBLICATIONS

Non-Final Office Action, U.S. Appl. No. 17/586,604, filed Aug. 28, 2023, 15 pages.

Non-Final Office Action, U.S. Appl. No. 17/586,609, filed Sep. 6, 2023, 16 pages.

Final Office Action, U.S. Appl. No. 17/586,604, filed Dec. 21, 2023, 18 pages.

Final Office Action, U.S. Appl. No. 17/586,609, filed Dec. 19, 2023, 18 pages.

Non-Final Office Action, U.S. Appl. No. 17/586,609, filed Mar. 13, 2024, 16 pages.

Notice of Allowance, U.S. Appl. No. 17/586,604, filed Mar. 29, 2024, 9 pages.

Examination Report, AU App. No. 2022275525, filed Jul. 19, 2024, 5 pages.

Final Office Action, U.S. Appl. No. 17/586,609, filed Aug. 1, 2024, 17 pages.

* cited by examiner

ORGANIZING A GRAPHIC DESIGN DOCUMENT USING SEMANTIC LAYERS

BACKGROUND

Recent years have seen significant improvements in computer systems for implementing artificial intelligence and machine learning models. For example, computer systems can implement machine learning models (such as neural networking models) to identify objects portrayed in digital images, generate digital animations and other content, etc. Such advancements have occurred as a result of many factors in relation to training data sourcing and generation, feature engineering, model engineering (e.g., modification of machine-learning architecture and parameters), model training, and improved model operation.

As a result, applications increasingly integrate machine learning for a variety of purposes. For example, graphics editing systems, such as graphic design applications, include tools for users to create and edit visual compositions (also referred to as "graphics" or "graphical designs"). Machine learning enables automated content generation, for example, to be added as a tool to such graphic design applications. However, such applications were not designed with machine learning in mind. As such, while machine learning may be integrated into the applications to expand their functionality, the graphic design application fundamentally remains a conventional application which does not fully utilize the capabilities of machine learning that a fully integrated machine learning-based graphic design application would.

SUMMARY

Introduced here are techniques/technologies that enable manage of a graphic design document using semantic layers. In some embodiments, a graphic design system enables content to be generated using semantic drawing tools. Such tools allow for users to select a content type and then add the content to the drawing by, for example, painting a content texture on the digital canvas, dragging and dropping a content model from a content library, etc. When such content is added, a machine learning model associated with the content is used to generate the content being added. Because the drawing tools are semantically aware, semantic information about the content added to the drawing is known. Accordingly, the graphic design system creates a semantic layer for the new content which includes semantic information about the content.

In some embodiments, the semantic information is used to generate a semantic context for the drawing. The semantic context is used to identify spatial, stylistic or other errors or inconsistencies in the document. For example, content can be automatically scaled based on where the content is added in the drawing, and the content adjacent to that location. Additionally, the z-order of layers can be analyzed based on the semantic context and modified based on the content of the layers.

In some embodiments, the semantic information can also be used to semantically organize the drawing. For example, a scene graph represents the layers and/or content of the drawing and how those layers are related. Using the semantic scene graph, layers can be more readily selected for editing or other manipulation by the user. Additionally, the semantic scene graph provides an organized summary of the drawing that is more useful to other users who may have additional work to add to the drawing.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
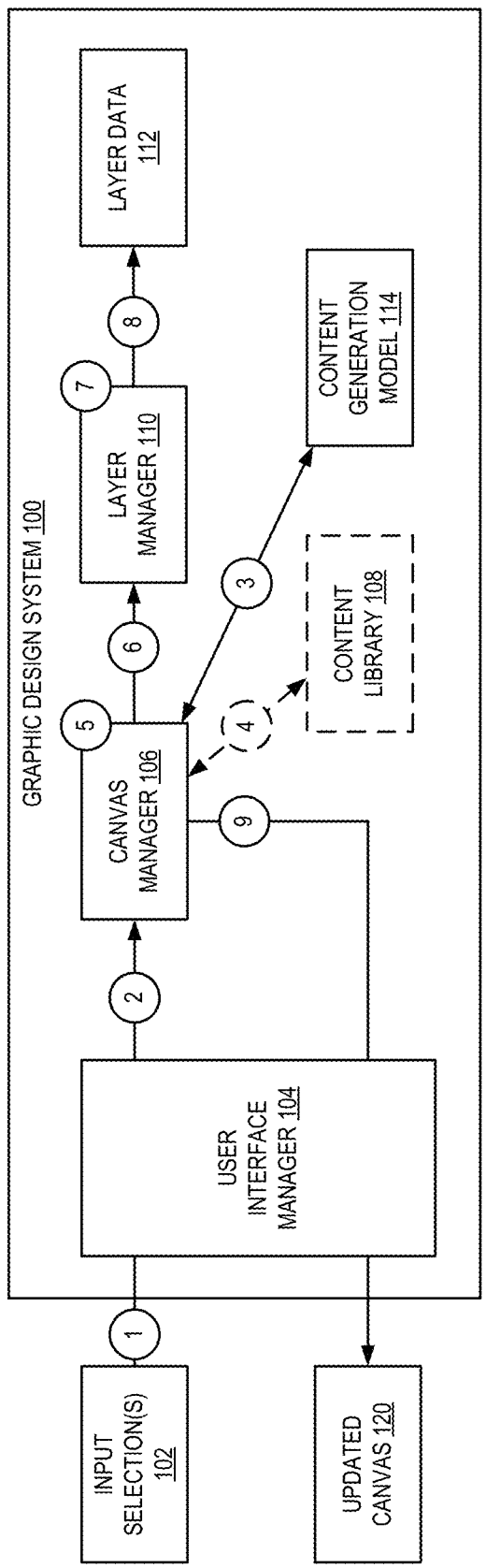
FIG. 1 illustrates a diagram of a process of machine learning-based content creation in accordance with one or more embodiments.

One or more embodiments of the present disclosure include a machine learning-based graphic design system which semantically organizes a user's graphic design project as it is drawn. For instance, many graphics editing systems allow users to create and edit separate layers of content to modify corresponding visual characteristics or positions of components of their graphics. To illustrate, graphics editing systems can include graphic design applications with options for users to add elements, organize elements, and/or modify characteristics (e.g., color, lighting, etc.) of all or some elements of a graphic via layers. However, the management and organization of layers is typically left to the user, which means that they are often underutilized and can even increase the complexity of navigating a document.

Embodiments provide semantic layers which include layers that are aware of their content. Unlike traditional graphic design tools where the user draws content manually, semantic graphic design tools allow for content of specific types to be generated (e.g., using machine learning, content libraries, etc.) based on user inputs. For example, the user can paint an area of a digital canvas with a "grass" drawing tool and that area will be filled with generated grass. Such semantic tools inherently carry additional information about the content being created than traditional design tools which may only know certain properties (e.g., pixel characteristics in a raster design tool; vector properties in a vector design tool, etc.).

Using this information, the graphic design system automatically generates semantic layers based on the user's interaction with the drawing. This enables the graphic design system to organize the drawing for the user, without requiring additional input. This can include grouping or consolidating layers of similar content, arranging the layers in an appropriate z-order based on the content of the layers, automatically sizing content as it is added based on its location within the drawing and any adjacent content or layers, etc. Additionally, from this semantic context, the graphic design system can apply content linting rules. Similar to traditional linting, where code is analyzed for programmatic or stylistic errors, content linting determines spatial, semantic, or other inconsistencies between layers and/or content of the drawing based on the semantic context of the drawing.

Additionally, the semantic information can be used to hierarchically organize the drawing. For example, a scene graph represents the layers of the drawing and how those layers are related. Using the semantic information, these relationships can include semantic relationships capturing how the content of different layers are related to each other. Using the semantic scene graph, layers can be more readily selected for editing or other manipulation by the user. Additionally, the semantic scene graph provides an organized summary of the drawing that is more useful to other users who may have additional work to add to the drawing. This is particularly useful for collaborative documents being worked on by remote teams, where additional context is helpful.

FIG. 1 illustrates a diagram of a process of machine learning-based content creation in accordance with one or more embodiments. As shown in FIG. 1, a graphic design system 100 can receive one or more input selections 102 from a user, system, application, or other entity, at numeral 1. Graphic design system 100 includes a semantic drawing and painting tool which enables users to select the content they wish to create and then add it to the drawing canvas. For example, if the user wants to add grass to a drawing, the user can select a "grass" tool and then "paint" an area of the canvas with the grass tool. One or more machine learning models then generate the grass content in the painted area.

In various embodiments, the machine learning models include one or more neural networks trained to generate one or more types of content. For example, one machine learning model may include a generative adversarial network (GAN) which has been trained to generate new or varied content based on an input. Various types of neural networks may be used, depending on the application, the content being generated, etc. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As shown in FIG. 1, the input selections 102 may be received by user interface manager 104. The user interface manager 104 provides a user interface through which the user edits or creates a drawing using the graphic design system 100. In some embodiments, the user interface manager 104 provides a canvas (e.g., a panel of the user interface in which the drawing is made) along with access to various drawing tools. For example, the user interface may include textures corresponding to different content which the user can select to be added to the drawing. At numeral 2, the input selections are provided to canvas manager 106. For example, the canvas manager 106 may detect the region of the canvas selected by the user via the user interface manager by receiving position data associated with the user's cursor, finger or stylus position on a touchscreen, or other input device. Additionally, the canvas manager 106 may receive the selected texture.

At numeral 3, the canvas manager sends a content request to the content generation model 114. In some embodiments, the request includes the selected region and content type are provided to a content generation model 114. In some embodiments, the content type is associated with a specific content generation model. In such instances, the canvas manager maintains a mapping of content textures to content generation models and routes the request to the appropriate model when the user paints a region with the selected texture. In some embodiments, the region boundaries to be filled with generated content are provided to the content generation model. Additionally, or alternatively, in some embodiments, the input selection(s) 102 include a selection of an object from a content model. For example, a content library 108 can provide a variety of objects that can be added to a drawing (e.g., trees, people, vehicles, etc.). In some embodiments, these are static objects obtained from the library. Alternatively, the appearance of the objects may be generated by a machine learning model (such as a content generation model) when an instance of the selected object is added to the canvas. In such instances, at numeral 4, the canvas manager 106 sends a request to content library 108 for the selected content.

At numeral 5, the canvas manager receives the requested content (e.g., generated content from the content generation model 114, content from content library 108, etc.) and adds the content to the canvas. When this new content is received, the canvas manager sends a request to layer manager 110 at numeral 6 to generate a new layer for the content. The layer manager 110 receives information associated with the layer detects the new content and receives semantic information associated with the new content from canvas manager 106. The layer may be defined as covering the same region as the new content. Alternatively, if the same or similar content exists elsewhere in the canvas, the new content may be added to an existing layer, added to a new layer grouped with the existing layer, or otherwise linked with similar content, as discussed further below.

In various embodiments, the semantic information received from the canvas manager 106 can include the content type, the location where the content was added, the way the user added the content (e.g., painting, drag and drop, etc.), nearby layers and/or content types, etc. At numeral 7, the layer manager encodes the semantic information into the new layer and adds an entry associated with the new layer to layer data 112, at numeral 8. Layer data 112 can include a data store or data structure which maintains semantic information associated with each layer. In some embodiments, as discussed below, the layer data 112 is used to organize the document based on the semantic relationships between layers. With the canvas updated with the new content, at numeral 9 the updated canvas 120 is presented to the user via user interface manager 104. For example, the canvas is updated in real time or near real time with the additional content as it is generated.

In some embodiments, existing documents can be imported by graphic design system 100. These documents may include layers that do not include semantic information. In such instances, newly added content to the document may become associated with semantic layers as discussed above. While this provides additional information that is useful for organizing the new content, the relationships to the old content and layers remains unclear. Accordingly, in some embodiments, the existing document is processed by a semantic classifier. The semantic classifier receives the input document (or layers thereof) and returns a likely label for the content of each layer of the input document. If the document is a raster image that does not include layers, the classifier returns a class associated with each pixel. Pixels sharing a class can be added to a new semantic layer and the semantic class associated with that layer.

Figure 2:
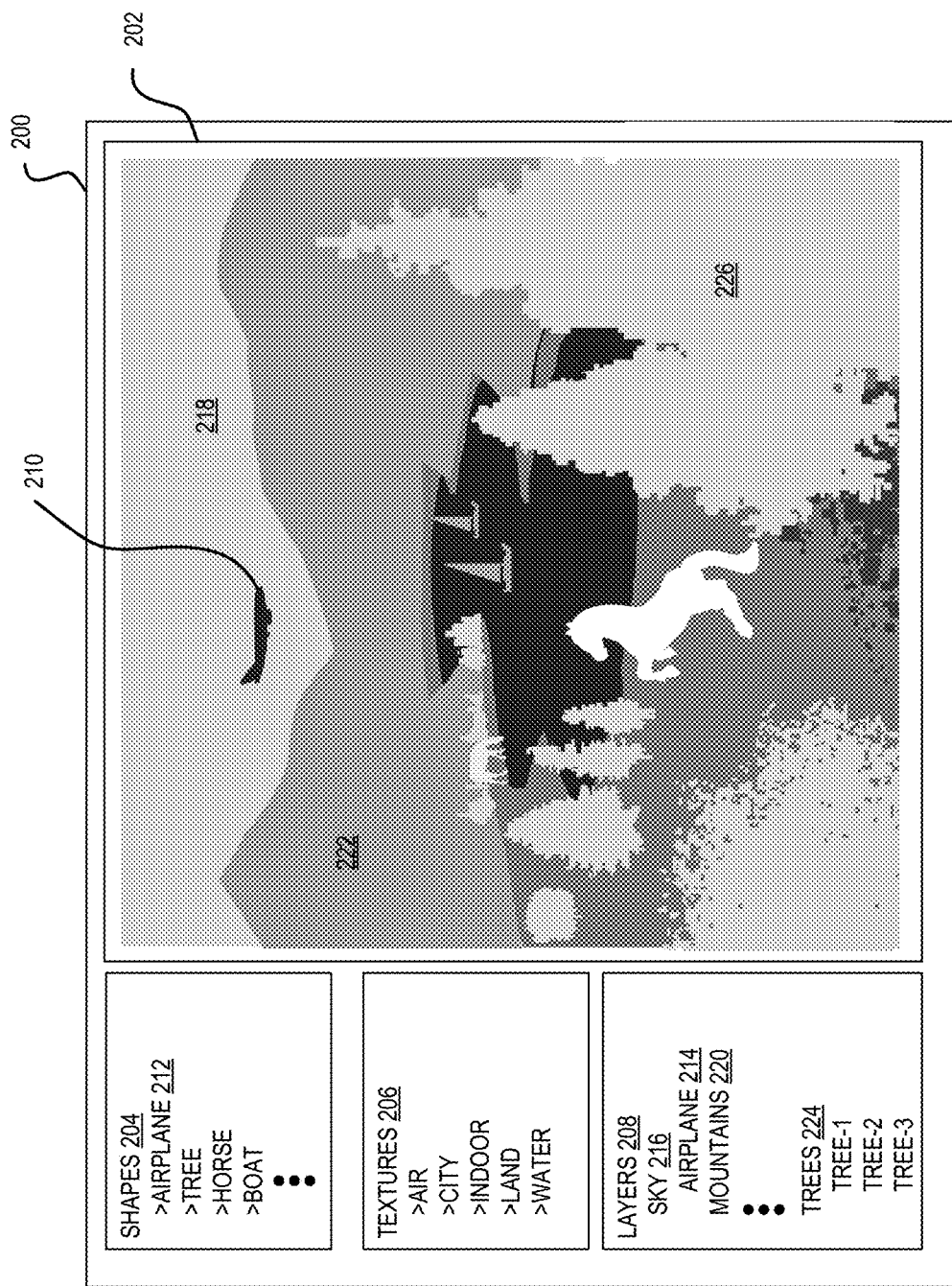
FIG. 2 illustrates an example of a user interface of a semantic drawing tool in accordance with one or more embodiments.

FIG. 2 illustrates an example of a user interface of a semantic drawing tool in accordance with one or more embodiments. As shown in FIG. 2, a user interface 200 includes a canvas 202 and content panels 204 and 206, and layers panel 208. The example user interface of FIG. 2 is not intended to be the exclusive implementation of such an interface and is included for simplicity of explanation. For example, alternative user interface elements, spatial organization, etc. may be implemented depending on the hardware platform on which the user interface 200 is running (e.g., tablet, smartphone, laptop, desktop, etc.). Additionally, alternative user interface elements may be used to display content options, layers, etc.

In the example of FIG. 2, canvas 202 illustrates a layer map. This is an editable canvas onto which the user may add content which is then generated and displayed in a separate panel of the user interface (not shown). The user can select a shape from shape panel 204 and drag-and-drop the selected shape onto the canvas 202. For example, the user can select an airplane from the airplane shape 212 from the shapes panel 204 and drag it onto the canvas. Airplane 210 is one such example. Other content, such as the lake, the sky, the mountains, etc. can be painted on the canvas by the user. For example, the user can select a corresponding texture from texture panel 206 and use a painting tool (e.g., a brush, a pencil, etc.) to paint the content on the digital canvas. The corresponding content is then generated as discussed above.

As discussed above, when the user adds content to the canvas, a semantic layer is automatically added to the drawing which includes semantic information about the object that has been added. In this example, an airplane layer 214 is added as shown in the layers panel 208. Because of the placement of the airplane (e.g., in the sky of the drawing), the airplane layer 214 is shown nested within the sky layer 216. This organization can be performed automatically based on the positioning of the content (e.g., the airplane content 210 on top of the sky content 218) and also on the semantic knowledge of the content of both the airplane layer, the sky layer, and information about how airplanes and the sky are typically related. Likewise, the layers 208 include a mountains layer 220 corresponding to mountain content 222 and trees layer 224 corresponding to tree content 226.

Figure 3:
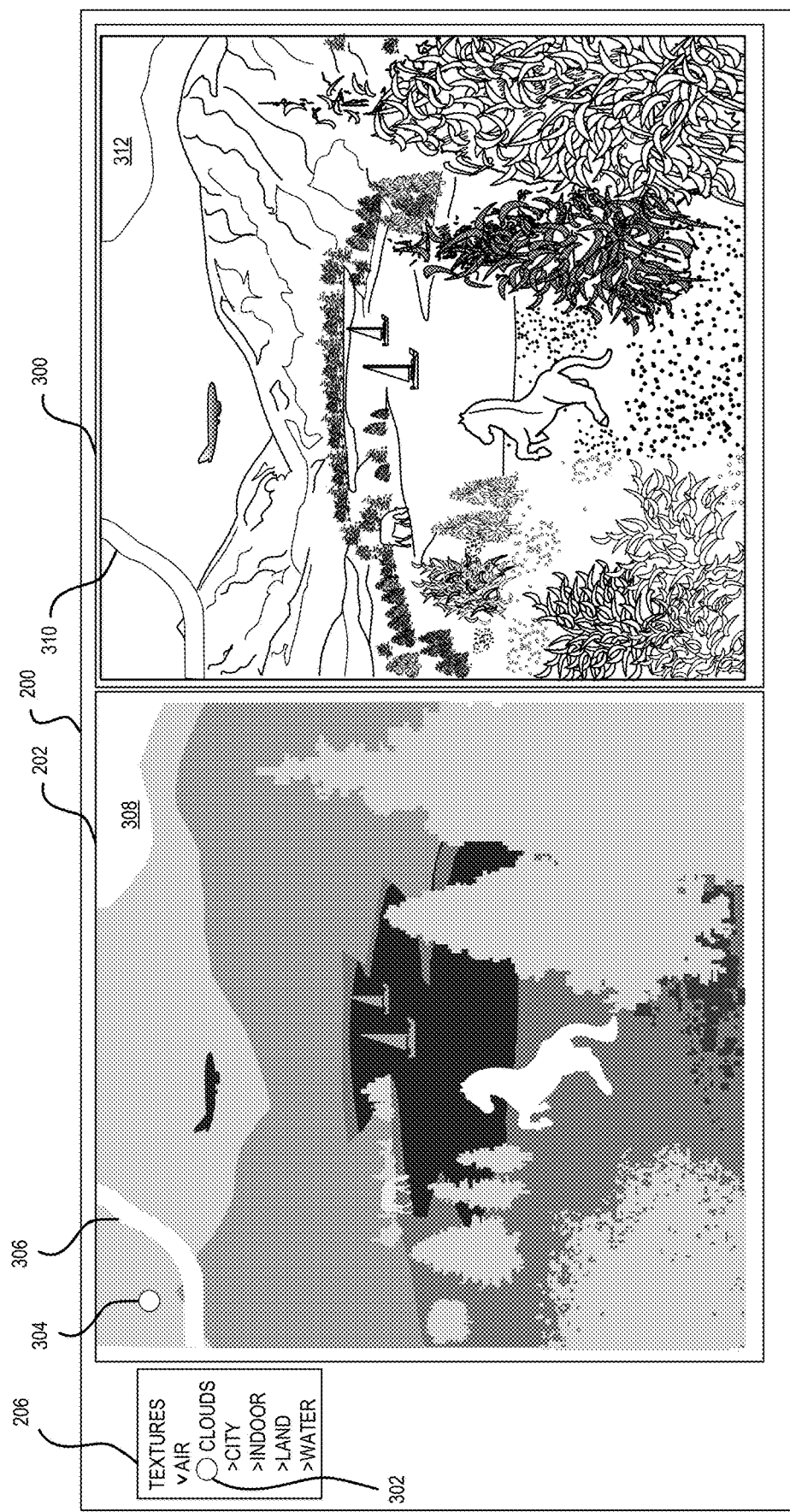
FIGS. 3-5 illustrate an example of managing z-order of layers based on semantic information in accordance with one or more embodiments.
Figure 4:
Figure 4:
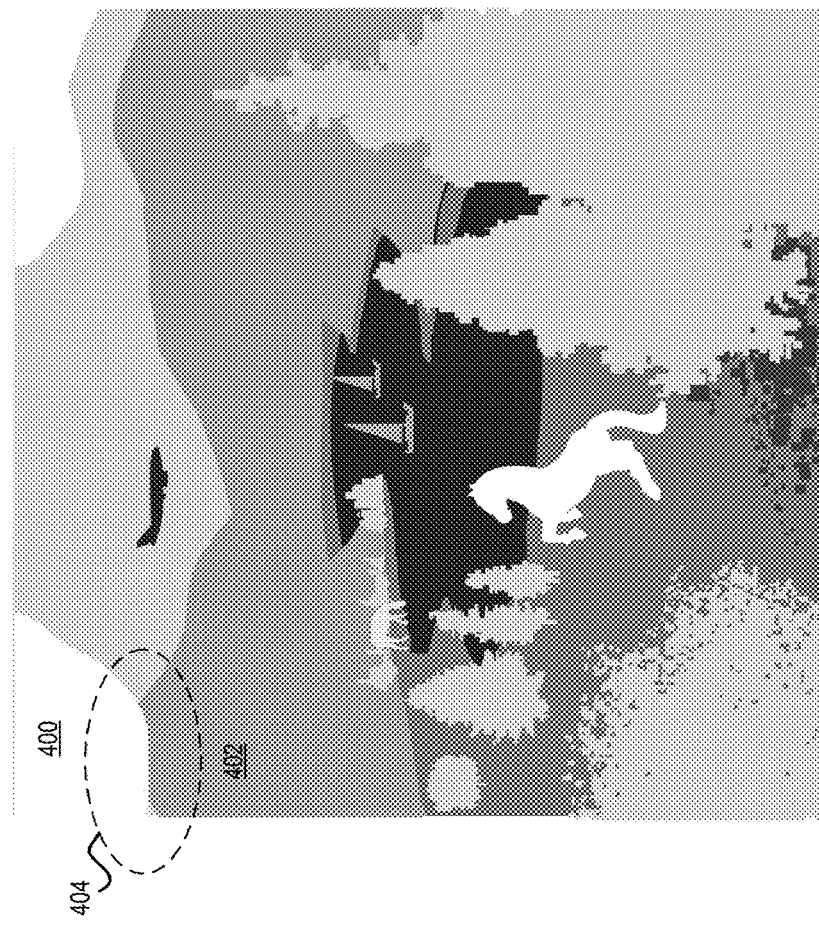
Figure 5:
Figure 5:

FIGS. 3-5 illustrate an example of managing z-order of layers based on semantic information in accordance with one or more embodiments. As shown in FIG. 3, a user interface 200 includes the canvas 202 illustrating a layer map, as described above with respect to FIG. 2, and a canvas 300 illustrating the corresponding generated content. In the example of FIG. 3, the user selects a clouds texture 302 from texture panel 206 and then "paints" cloud content onto layer map 202. For example, the user's cursor 304 becomes a brush head which the user then clicks and drags (or taps and drags, etc. depending on interface implementation) to add cloud content to the drawing. Here, cloud layers 306 and 308 are added which correspond to cloud content 310 and 312 as shown in content canvas 300.

As shown in FIG. 4, once the cloud content is drawn, cloud region 400 is in front of mountain region 402, as shown in area 404. This represents a likely unrealistic outcome, as the cloud coverage is likely not to be intended on top of/in front of the mountain. This can be determined semantically based on knowledge of the content of the layers (e.g., mountain content and cloud content) and semantic rules that define how different types of content are related. For example, the semantic relationships for the document may define that clouds are by default background content and that other content should appear in front of cloud content. This includes mountain content 402. As such, the z-order of the layers shown in FIG. 4 is incorrect.

In some embodiments, the layer manager 110 is responsible to managing z-order of layers as content is added to the canvas. For example, as shown in FIG. 5, the z-order of the layers has been updated appropriately to place the cloud layer 500 behind the mountain layer, resulting in a more realistic depiction of these elements at 504. In some embodiments, this z-order updating is performed as content is created based on the semantic relationships between layers and the placement of the content on the canvas. Additionally, or alternatively, user input can be used to define the z-order as the content is created (e.g., by specifying a z-order, undoing the automatic updating, etc.).

Figure 6:
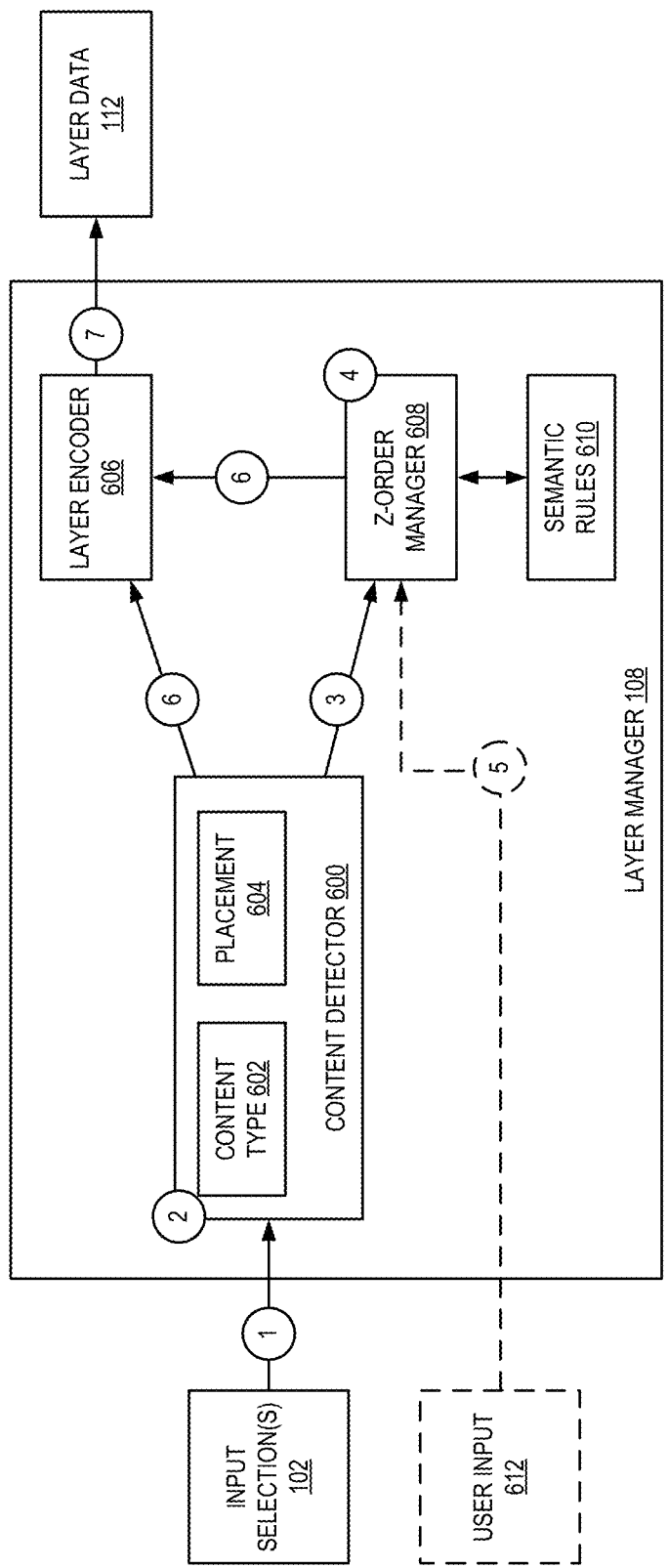
FIG. 6 illustrates a diagram of a layer manager in accordance with one or more embodiments.

FIG. 6 illustrates a diagram of a layer manager in accordance with one or more embodiments. As shown in FIG. 6, the layer manager 110 receives input selection(s) 102 at numeral 1. As discussed above, the input selections may be passed through to the layer manager by a user interface manager and/or canvas manager. Additionally, or alternatively, the input to the layer manager 110 can be generated by the canvas manager based on the input selections received from the user. In particular, the layer manager 110 includes a content detector 600, layer encoder 606, and z-order manager 608.

At numeral 2, content detector 600 identifies a content type 602 and placement data 604 associated with the input selections 102. Using the example of FIGS. 3-5, the content type includes a "cloud texture" and the placement data includes data representing the region of the canvas which the user has painted with the cloud texture. This may include coordinates in the canvas coordinate system defining boundaries of the user-selected region. In some embodiments, placement data 604 also includes relative placement of the new content compared to existing content in the document (e.g., other nearby layers to the new content location, etc.).

At numeral 3, information about the new content is provided to z-order manager 608. Z-order manager 608 is responsible for determining an appropriate z-order for the layers of the document, at numeral 4. In some embodiments, z-order manager 608 uses one or more semantic rules 610 which define relationships between different semantic classes of content supported by the graphic design system. This includes rules provided by a provider of the graphic design system (e.g., application developer, plug-in developer, etc.), the end user or organization using or hosting the graphic design system, or other entity. For example, the semantic rules 610 can define common arrangements of content types relative to one another. In some embodiments, the semantic rules can include a z-order network, such as a neural network trained to predict a likely z-order of one or more layers associated with known content types. Such a z-order network may be trained on publicly available graphic design document datasets, documents that represent a "house style," or other training datasets. In some embodiments, the z-order manager optionally factors in user input 612, at numeral 5. For example, the user can select a specific z-order or override a presented z-order (e.g., through a hot key, response to an on-screen prompt, or other user input). Based on the semantic rules and the optional user input, at numeral 6, the layer encoder 606 receives semantic information associated with the new content from the content detector and the z-order received from the z-order manager 608 and encodes a new semantic layer with the data. At numeral 7, the new semantic layer is added to layer data 112. In some embodiments, when updating a z-order for a new layer, the layer encoder additionally updates any existing layers with updated z-order information.

Figure 7:
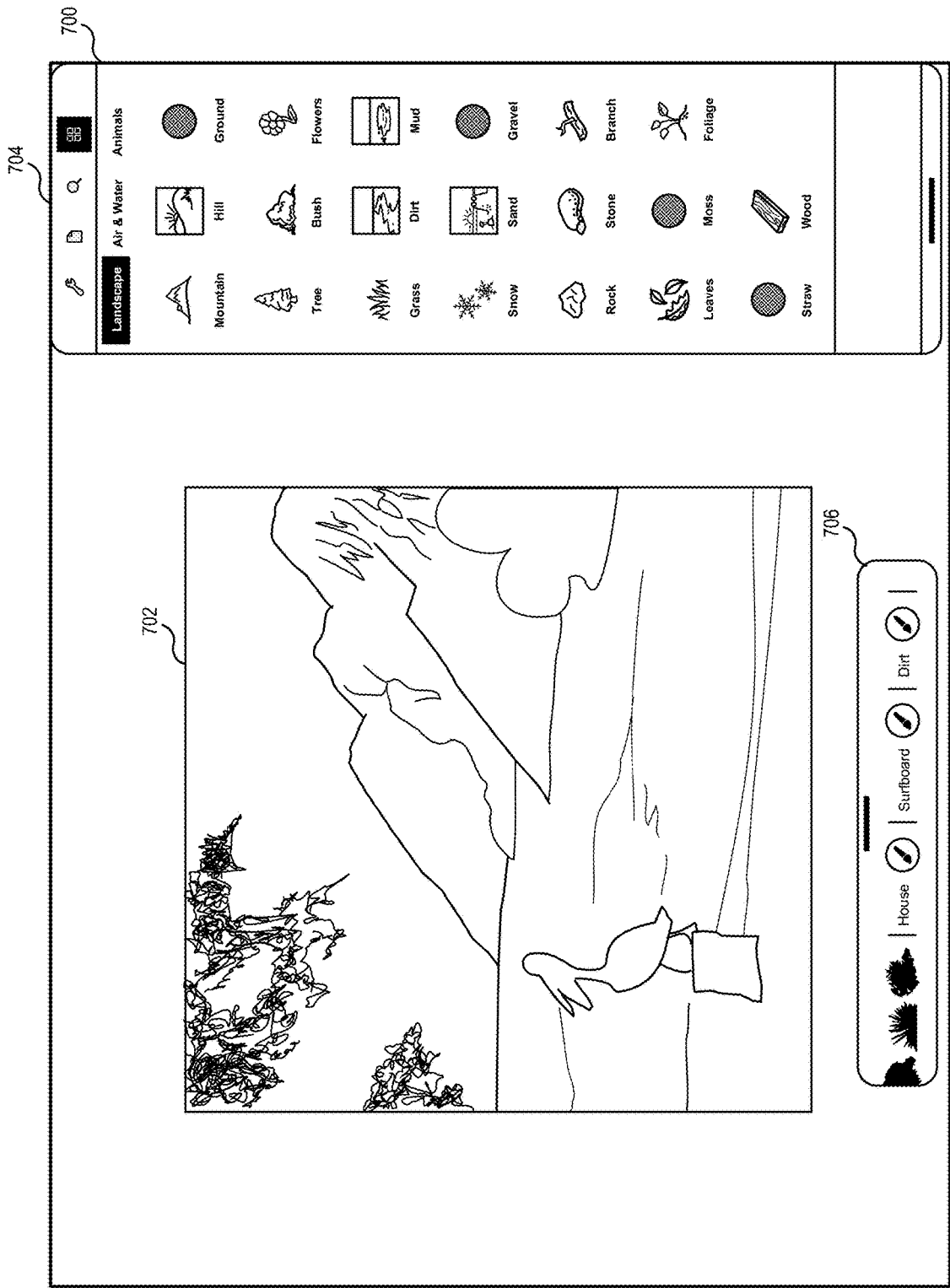
FIG. 7 illustrates an example of a user interface for providing content suggestions in accordance with one or more embodiments.

FIG. 7 illustrates an example of a user interface for providing content suggestions in accordance with one or more embodiments. As shown in FIG. 7, a user interface 700 of a graphic design system can include a canvas 702 and a content panel 704. Similar to the user interfaces described above, the content panel can include various objects and/or textures which can be used to create the drawing shown on canvas 702. The user interface 700 can also include a prediction panel 706, which provides content recommendations based on the semantic information about the content that has been added to the canvas up to that point.

In the example of FIG. 7, the drawing is of a beach scene, featuring water, mountains, a pelican, etc. Content recommendations can be tailored to this scene using a content recommendation model. The content recommendation model may be a neural network trained on scene data. The scene data may be labeled with semantic classes of the content of each scene and the content recommendation model can be trained to predict classes of content likely to appear given a set of input classes. Such a model, when deployed, can then perform inference on the set of classes associated with a document while the document is being created by the user. For example, each time new content is added, a new inference request is sent to the model and one or more predicted content classes are returned. These are then presented to the user via prediction panel 706. In this example, the predicted classes include house, surfboard, and dirt textures, along with various bush objects.

Figure 8:
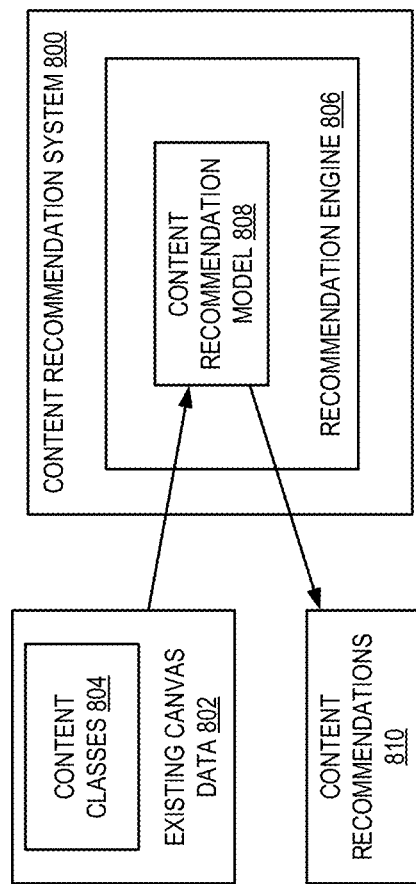
FIG. 8 illustrates an example of a content suggestion system in accordance with one or more embodiments.

FIG. 8 illustrates an example of a content suggestion system in accordance with one or more embodiments. As discussed, in some embodiments, content recommendations are provided to the user via the graphic design system user interface. For example, existing canvas data 802 is provided to a recommendation engine 806 of content recommendation system 800. In some embodiments, content recommendation system is implemented as part of graphic design system 100. Additionally, or alternatively, content recommendation system 800 is implemented as a separate system or service. For example, the content recommendation system 800 can be implemented as a cloud-based service as part of a suite of cloud-based applications. The graphic design system can provide the existing canvas data periodically, or upon detection of a particular event (e.g., a change to the existing canvas data due to new content types being added).

The existing canvas data 802 can include content classes 804 associated with the user's current drawing. In some embodiments, the content classes 804 are provided as structured data. In some embodiments, the content classes are first preprocessed by another neural network to generate a representation of the set of content classes which is then provided to the content recommendation model. The content recommendation model 808 then performs inference on the set of content classes 804 and predicts one or more content classes likely to be included in a drawing that includes the set of content classes. The predicted classes are then provided as content recommendations 810 and presented to the user via the user interface, as discussed above. In some embodiments, the predicted classes having a probability greater than a threshold value are presented while those with a probability below the threshold value are discarded.

Figure 9:
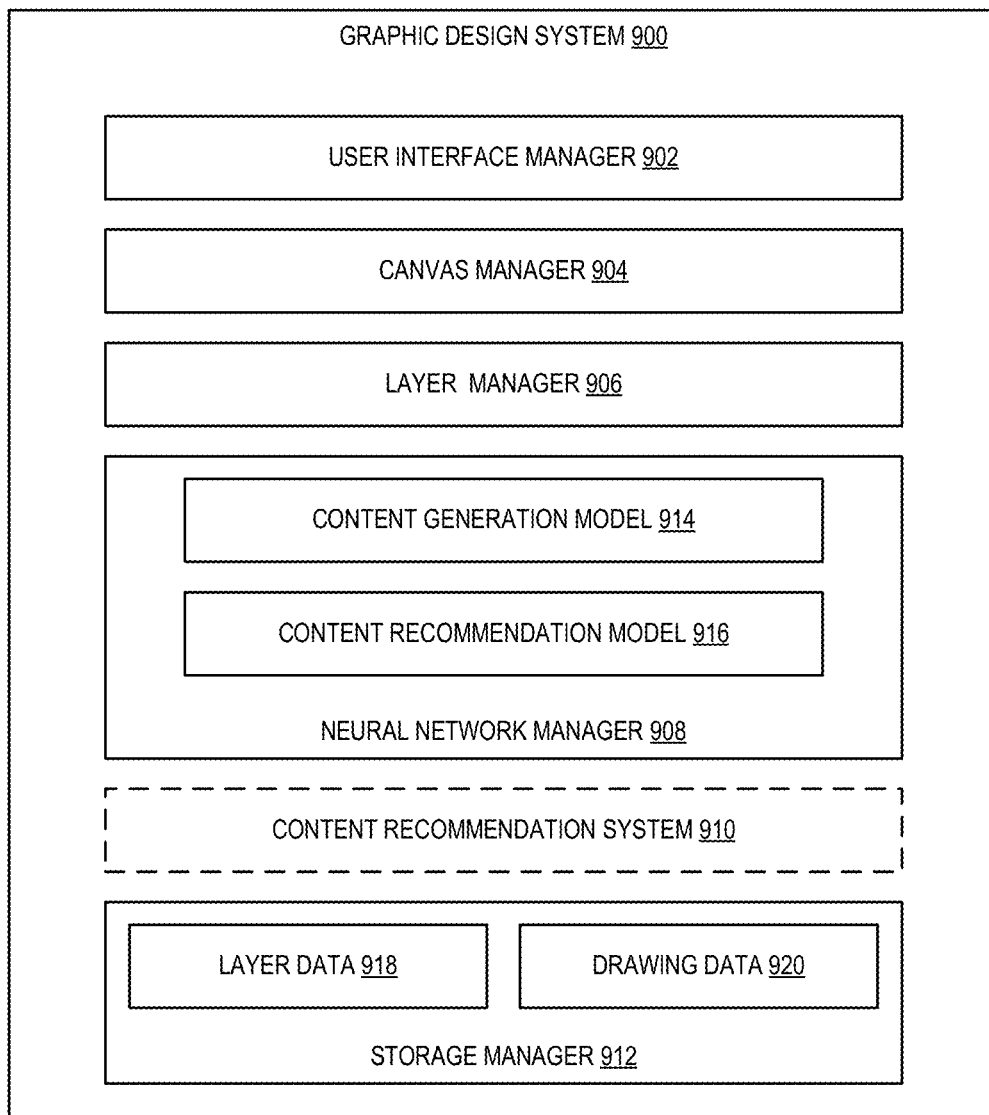
FIG. 9 illustrates a schematic diagram of a graphic design system in accordance with one or more embodiments.

FIG. 9 illustrates a schematic diagram of graphic design system (e.g., "graphic design system" described above) in accordance with one or more embodiments. As shown, the graphic design system 900 may include, but is not limited to, user interface manager 902, canvas manager 904, layer manager 906, neural network manager 908, content recommendation system 910, and storage manager 912. The neural network manager 908 includes a content generation model 914 and a content recommendation model 916. The storage manager 912 includes layer data 918 and drawing data 920.

As illustrated in FIG. 9, the graphic design system 900 includes a user interface manager 902. For example, the user interface manager 902 allows users to request content to be generated and added to a canvas provided by the graphic design system 900. This includes providing tool access through one or more user interface panels, menus, or other user interface elements. Additionally, the user can create and edit drawings directly on the canvas by painting content textures, dragging and dropping objects, and/or directly editing the canvas using provided drawing tools. In some embodiments, the user interface manager 902 provides a user interface through which the user can select content textures and objects, drawing tools, etc., as discussed above. Alternatively, or additionally, the user interface enables the user to open and edit existing drawings from a local or remote storage location (e.g., by providing an address (e.g., a URL or other endpoint) associated with a document store). In some embodiments, the user interface provides content recommendations based on the semantic information associated with the content already present in the drawing. The user can browse the recommended content and choose whether to add any of the recommended content to the drawing.

As illustrated in FIG. 9, the graphic design system 900 also includes canvas manager 904. As discussed, canvas manager receives a request for new content from the user via user interface manager 902 and coordinates creation of a new semantic layer corresponding to the content and generation of the content by content generation model 914. For example, when a user selects a content type to add to the canvas and paints an area of the canvas with the selected content, the content type and painted area is provided by canvas manager 904 to content generation model 914. As discussed, the content generation model 914 may be specific to the content type. Once the content has been generated, the canvas manager updates the canvas appropriately. Additionally, the canvas manager can send a request to layer manager 906 to generate a new semantic layer for the new content. The request can include semantic information about the content to be included in the layer data 918. The updated drawing can be stored in drawing data 920.

As illustrated in FIG. 9, the graphic design system 900 also includes layer manager 906. As discussed, layer manager 906 receives semantic layer information from canvas manager 904. Layer manager 906 creates a new semantic layer and encodes the semantic information in that layer. This may include the content associated with that layer, the location of the layer on the canvas and nearby layers, z-order of the layers, etc. Once a new semantic layer is created, its associated layer data 918 is stored along with the layer data of other layers and may be used to organize the drawing, provide content recommendations, etc.

As illustrated in FIG. 9, the graphic design system 900 also includes a neural network manager 908. Neural network manager 908 may host a plurality of neural networks or other machine learning models, such as content generation model 914 and a content recommendation model 916. The neural network manager 908 may include an execution environment, libraries, and/or any other data needed to execute the machine learning models. In some embodiments, the neural network manager 908 may be associated with dedicated software and/or hardware resources to execute the machine learning models. As discussed, content generation model 914 and content recommendation model 916 can be implemented as various types of neural networks. In some embodiments, neural network manager 908 includes a plurality of content generation models, each associated with a different content to be generated (e.g., different content textures may be associated with different models).

As illustrated in FIG. 9, the graphic design system 900 also includes a content recommendation system 910. In some embodiments, content recommendation system 910 is implemented as part of graphic design system 900. Alternatively, content recommendation system 910 is implemented as a separate system that is in communication with the graphic design system. Additionally, in such embodiments where the content recommendation system is implemented separately, the content recommendation system hosts the content recommendation model itself (e.g., in its own neural network manager or other model hosting environment). Periodically as the user is creating a drawing using graphic design system 900, semantic information associated with at least some of the layers of the drawing is provided to the content recommendation system. As discussed, the content recommendation model 916 is trained on drawing data such that it learns what types of content commonly appear together. The content recommendation model returns a prediction of one or more types of content that are likely to appear with the content in the drawing and returns the recommended content types to the user via the user interface manager.

As illustrated in FIG. 9, the graphic design system 900 also includes the storage manager 912. The storage manager 912 maintains data for the graphic design system 900. The storage manager 912 can maintain data of any type, size, or kind as necessary to perform the functions of the graphic design system 900. The storage manager 912, as shown in FIG. 9, includes the layer data 918. The layer data 918 can include semantic information associated with the layers of a drawing, as discussed in additional detail above. In particular, in one or more embodiments, the layer data 918 includes semantic information associated with the type of content represented in each layer. In some embodiments, the layer data includes information about the relative positioning of the layer on the canvas (e.g., nearby layers) and z-order of the layers. The storage manager 912 also includes drawing data 920. The drawing data 920 can include drawing files created, or editable, by graphic design system 900.

Each of the components 902-910 of the graphic design system 900 and their corresponding elements (as shown in FIG. 9) may be in communication with one another using any suitable communication technologies. It will be recognized that although components 902-912 and their corresponding elements are shown to be separate in FIG. 9, any of components 902-912 and their corresponding elements may be combined into fewer components, such as into a single facility or module, divided into more components, or configured into different components as may serve a particular embodiment.

The components 902-912 and their corresponding elements can comprise software, hardware, or both. For example, the components 902-912 and their corresponding elements can comprise one or more instructions stored on a computer-readable storage medium and executable by processors of one or more computing devices. When executed by the one or more processors, the computer-executable instructions of the graphic design system 900 can cause a client device and/or a server device to perform the methods described herein. Alternatively, the components 902-912 and their corresponding elements can comprise hardware, such as a special purpose processing device to perform a certain function or group of functions. Additionally, the components 902-912 and their corresponding elements can comprise a combination of computer-executable instructions and hardware.

Furthermore, the components 902-912 of the graphic design system 900 may, for example, be implemented as one or more stand-alone applications, as one or more modules of an application, as one or more plug-ins, as one or more library functions or functions that may be called by other applications, and/or as a cloud-computing model. Thus, the components 902-912 of the graphic design system 900 may be implemented as a stand-alone application, such as a desktop or mobile application. Furthermore, the components 902-912 of the graphic design system 900 may be implemented as one or more web-based applications hosted on a remote server. Alternatively, or additionally, the components of the graphic design system 900 may be implemented in a suit of mobile device applications or "apps." To illustrate, the components of the graphic design system 900 may be implemented as part of an application, or suite of applications, including but not limited to ADOBE CREATIVE CLOUD, ADOBE PHOTO SHOP, ADOBE ACROBAT, ADOBE ILLUSTRATOR, ADOBE LIGHTROOM and ADOBE INDESIGN. "ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 10:
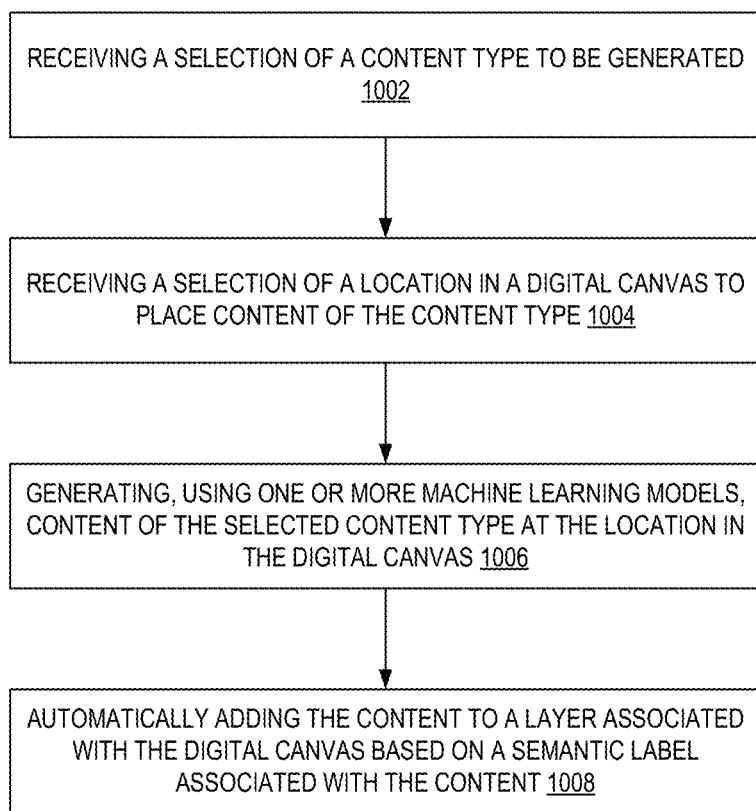
FIG. 10 illustrates a flowchart of a series of acts in a method of machine learning-based content generation in accordance with one or more embodiments.

FIGS. 1-9, the corresponding text, and the examples, provide a number of different systems and devices that allows for creation and management of semantic layers in a drawing document. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of machine learning-based content generation in accordance with one or more embodiments. In one or more embodiments, the method 1000 is performed in a digital medium environment that includes the graphic design system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a selection of a content type to be generated. As discussed, a graphic design system's user interface can provide a variety of content types to the user. The selection may be made via a user interface manager of the graphic design system. Some content types include content textures, which enable the user to paint an area of a digital canvas with a content type (e.g., cloud, sky, dirt, ocean, etc.) and corresponding content is then generated by a machine learning model. Additionally, content can include object models, such as animals, trees, vehicles, people, etc., which can be selected and then dragged and dropped (or otherwise added) to the digital canvas.

As illustrated in FIG. 10, the method 1000 includes an act 1004 receiving a selection of a location in a digital canvas to place content of the content type. As discussed, the selection may be made through the user interface manager of the graphic design system. For example, a region of the digital canvas can be painted by the user (e.g., selecting a drawing tool and the selected content type and then drawing over a region to select it). Alternatively, an object can be dropped to a specific location on the digital canvas.

As illustrated in FIG. 10, the method 1000 includes an act 1006 generating, using one or more machine learning models, content of the selected content type at the location in the digital canvas. As discussed, a canvas manager can send a request to a content generation model to generate corresponding content. The request can include the content type and the area to be filled.

As illustrated in FIG. 10, the method 1000 includes an act 1008 automatically adding the content to a layer associated with the digital canvas based on a semantic label associated with the content. As discussed, the canvas manager can request that content be generated and can also request that layer manager create a new semantic layer for the new content. The request can include semantic information (e.g., content type, location, etc.) associated with the new content. In some embodiments, automatically adding the content to a layer associated with the digital canvas includes identifying an existing layer associated with the content type, and adding the content to the existing layer.

In some embodiments, automatically adding the content to a layer associated with the digital canvas includes generating a new layer associated with the content, wherein the digital canvas is associated with a plurality of layers associated with the content type. In some embodiments, the method further includes in response to generating the new layer, determining a new z-order of the plurality of layers and the new layer based on the semantic label associated with the content and based on one or more semantic labels associated with the plurality of layers. In some embodiments, the method further includes combining the plurality of layers associated with the content type into a group of layers, wherein each layer includes content associated with the content type. In some embodiments, the group of layers includes hierarchy of layers (e.g., a semantic hierarchy, discussed below) organized semantically based on one or more content types.

In some embodiments, determining the new z-order includes determining the new z-order based on one or more semantic ordering rules using the semantic labels. In some embodiments, the user can specify a z-order placement. For example, the method can include receiving a user input indicating a z-order placement for the new layer, and determining a second new z-order based on the user input.

Linting is a static code analysis tool that is used to identify bugs, errors, and stylistic issues in code. This allows for small errors that might be easy for a programmer to miss to be identified and corrected before they lead to larger issues at later stages of development or deployment. In the drawing context, many small errors (e.g., placement of objects relative to other objects, geometrical relationships within an object, unrealistic physics, etc.) can all affect the way the drawing is perceived, but needed corrections may not always be readily apparent to the user.

Conventional graphic design applications include very little, if any, information about the content being created. Such conventional systems are typically limited to pixel values (e.g., color, transparency, etc.), properties of vector graphics (e.g., line width, fill, curve parameters, etc.) without any semantic understanding. This makes content linting (e.g., validation) difficult if not impossible, as there is little context to be used for determining whether there are errors in the drawing.

Semantic drawing tools include information about the content included therein. For example, content can be added to semantic layers which also include semantic information about the content (e.g., the content type, relative position to other layers or content, etc.). As a result, a semantic understanding of the drawing as a whole can be obtained. Content linting may then be performed on the drawing based on this semantic understanding, enabling a plurality of validation rules to be applied to the drawing to correct errors, such as placement, sizing, orientation, etc.

Figure 11:
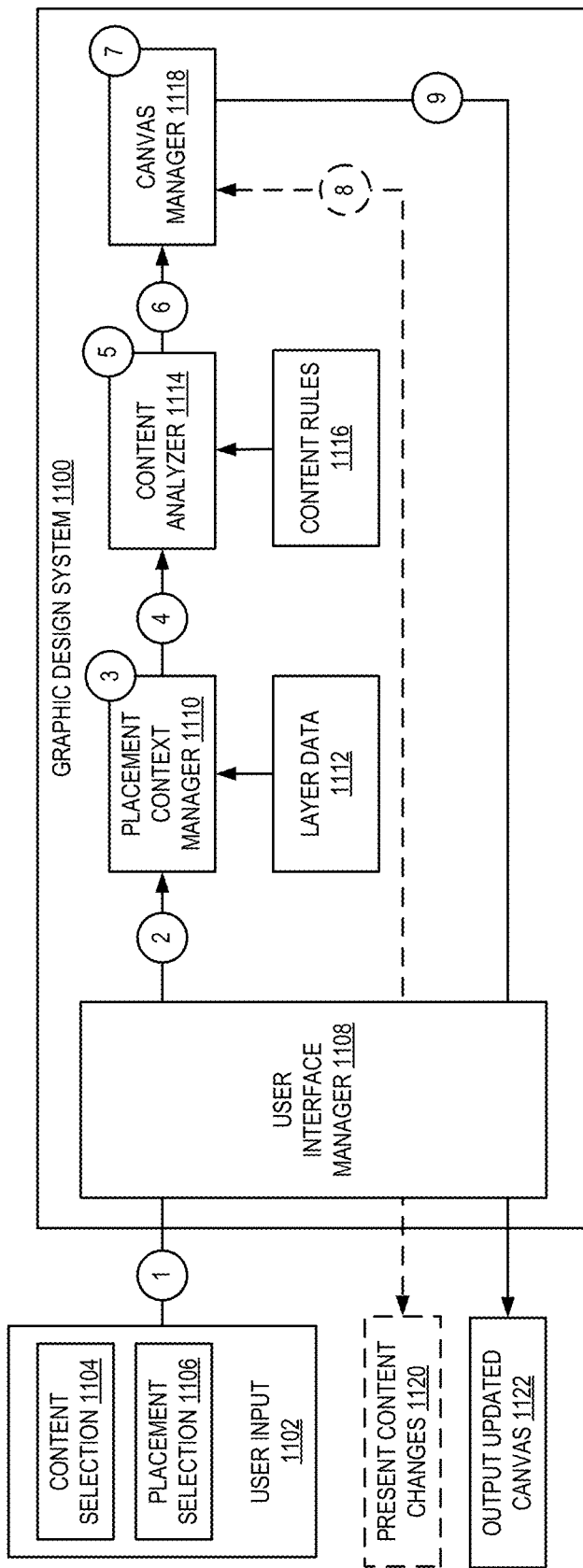
FIG. 11 illustrates a diagram of a process of content linting based on semantic information in accordance with one or more embodiments.

FIG. 11 illustrates a diagram of a process of content linting based on semantic information in accordance with one or more embodiments. Graphic design system 1100 can be implemented similarly to graphic design system 100, described above. As shown in FIG. 11, a graphic design system 1100 receives a user input 1102 which may include a content selection 1104 and a placement selection 1106. The user interface manager 1108 provides a user interface through which the user edits or creates a drawing using the graphic design system 1100. In some embodiments, the user interface manager 1108 provides a canvas (e.g., a panel of the user interface in which the drawing is made) along with access to various drawing tools, as discussed above with respect to FIG. 1.

At numeral 2, the content selection 1104 and placement selection 1106 made via the user interface manager 1108 is received by placement context manager 1110. At numeral 3, placement context manager 1110 generates a placement context associated with the new content. As discussed, the placement selection 1106 can include a location on a digital canvas where the content is being added. For example, the region being painted with a content texture, a location of a cursor where an object is being inserted, etc. The placement context includes the location on the digital canvas along with information about that location obtained from layer data 1112. In some embodiments, the layer data includes, semantic information associated with the layers, information about the relative positioning of layers on the canvas (e.g., nearby layers) and z-order of the layers. In some embodiments, any particular canvas location can be looked up in the layer data to identify nearby layers and their associated content. For example, a coordinate on the digital canvas may be determined to be over a first layer, which lies on top of a second layer. The placement context can then include a data structure that captures the relationship of the coordinate to the first layer and the second layer, and the semantic classes of the content in both of those layers.

The placement context is then provided to content analyzer 1114, at numeral 4. Content analyzer 1114 can apply content rules 1116 to the new content based on the placement context at numeral 5. The content rules 1116 can include size (e.g., scale) rules, alignment (e.g., orientation) rules, etc. For example, size rules define a range of sizes of content types that are consistent with the content types. The rules can be defined relatively (e.g., the size of one content type is dependent on the size of a content type that has already been added to the drawing). Similarly, alignment rules define how content should be aligned with other content. For example, if a car object is added to a road texture, the alignment rules may define how close the car object should be to the road texture and the car's orientation relative to the orientation of the road texture. Content rules can be defined by the user, their organization, or other entity. For example, default content rules can be provided by the developer of the graphic design system.

The general sequence of steps from numeral 1 to numeral 5 may be processed in a loop as new placement selections are received (e.g., due to the user moving their cursor position on the digital canvas). Accordingly, the placement context may be updated in real-time or near real-time and the updated placement context can then be analyzed by content analyzer as discussed above. This may result, for example, in the size of an object to vary as the user moves their cursor about the canvas until the object is placed in its final location. Alternatively, the sequence of steps from numeral 1 to numeral 5 can be processed discretely upon the occurrence of specific events. For example, when the user places content on the canvas, the placement context is determined at that location and the content analyzed.

In some embodiments, the results of the content analyzer 1114 include changes to be made to the content to comply with the content rules. For example, an object may need to be moved (e.g., by a number of pixels) to bring it into alignment with neighboring layers. Alternatively, the object may need to be resized, or the z-order of the layers may need to be changed. In some embodiments, multiple rules violations may be identified.

At numeral 6, the results of the content analysis are provided to canvas manager 1118. Based on the analysis, the canvas manager 1118 modifies the content added to the canvas or generates new content that complies with the content rules, at numeral 7. For example, the canvas manage moves content a number of pixels, resizes the content, reorients the content, etc., based on the content analysis. In some embodiments, this includes sending a request to a content generation model to generate new content Optionally, in some embodiments, at numeral 8, the content changes 1120 are presented to the user via user interface manager 1108 to accept or reject before they are made. Alternatively, the changes are made automatically, and the user is given the opportunity to rollback any changes that were undesired. Once the changes have been made, the updated canvas 1122 is presented to the user via the user interface manager 1108.

Figure 12:
FIG. 12 illustrates an example of sizing errors in accordance with one or more embodiments.
Figure 12:

FIG. 12 illustrates an example of sizing errors in accordance with one or more embodiments. As discussed above, embodiments provide a graphic design system which enables a user to add content to be generated. For example, the graphic design system can provide multiple canvases, such as canvas 1200 which provides a layer map and canvas 1202 which shows the generated content of the drawing corresponding to the layer map. This content includes content textures that enable a user to paint some content types (e.g., clouds, sky, grass, water, etc.) on the canvas and then that content is generated using a machine learning model. This content also includes objects that are dragged and dropped from a content library onto the canvas. Such objects include, but are not limited to, people, animals, vehicles, buildings, etc. The objects can include 3D models which can be oriented arbitrarily on the canvas and whose appearance can be generated by a machine learning model or obtained from the content library (e.g., as one of a set of fixed appearances).

As shown in FIG. 12, a cow object has been added to the canvas 1200. In this example, the cow is added at a default size regardless of its position on the canvas. Additionally, the new layer associated with the cow is placed with a z-order that is inconsistent with the rest of the elements of the drawing. For example, the cow is larger than the foreground trees but at least partially behind them, while also being behind the background trees which instead appear to be embedded in the cow, as shown at 1206. These show example content errors that can be introduced when new content is added to a canvas. In conventional systems, the user is left to manually adjust the drawing to make the new content consistent with the existing content. However, as discussed, embodiments can apply a plurality of content rules that leverage the semantic information known about the new content and the existing content to correct such errors as the content is created.

Figure 13:
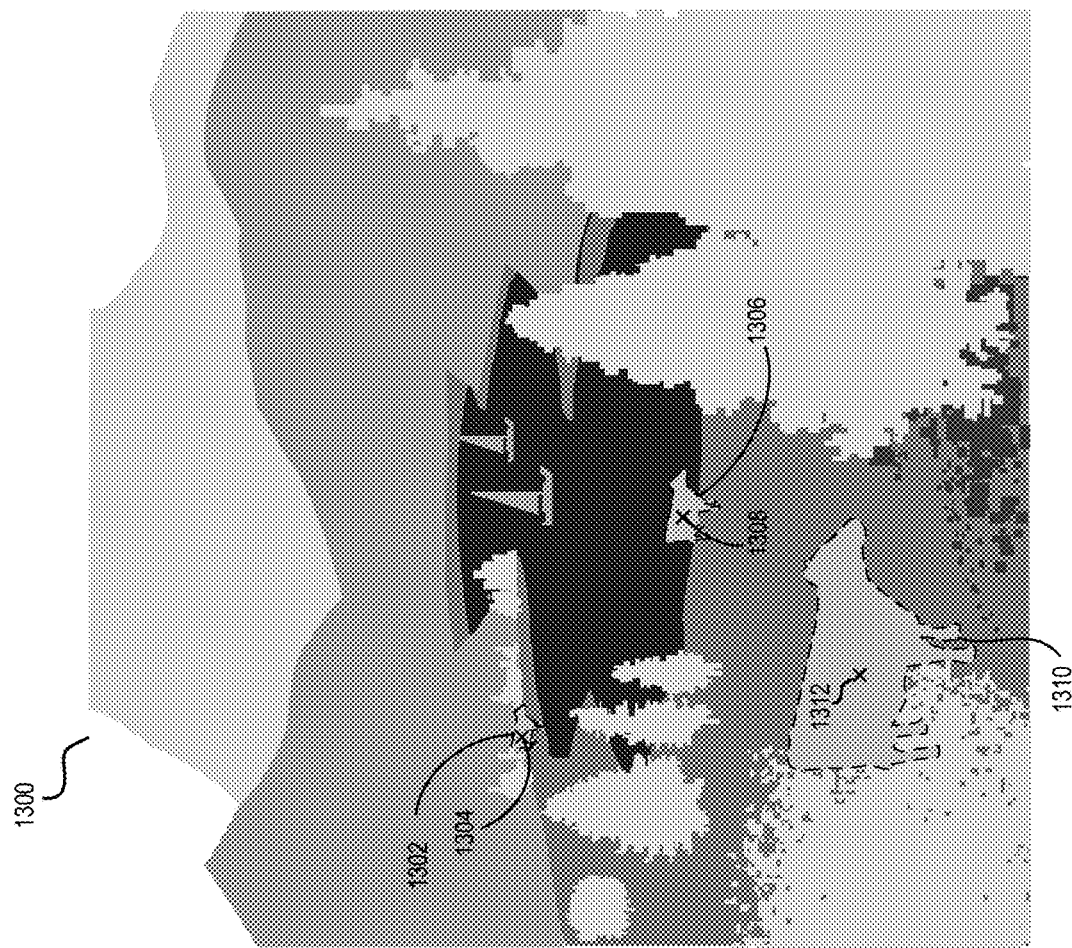
FIG. 13 illustrates an example of automatic sizing of new content in accordance with one or more embodiments.

FIG. 13 illustrates an example of automatic sizing of new content in accordance with one or more embodiments. As shown in FIG. 13, when the cow is instead placed at different locations in canvas 1300, it is sized appropriately given its placement context. For example, cow 1302, placed at location 1304, is sized consistent with its position in the distance of the scene and relative to the nearby bushes. Similarly, cow 1306, placed at location 1308, is larger than cow 1302, and cow 1310, at location 1312 in the foreground is larger still. As discussed, each cow is associated with a different placement context determined from its placement location 1304, 1308, 1312. In the example of FIG. 13, the cow is sized appropriately when it is placed on the canvas.

Figure 14:
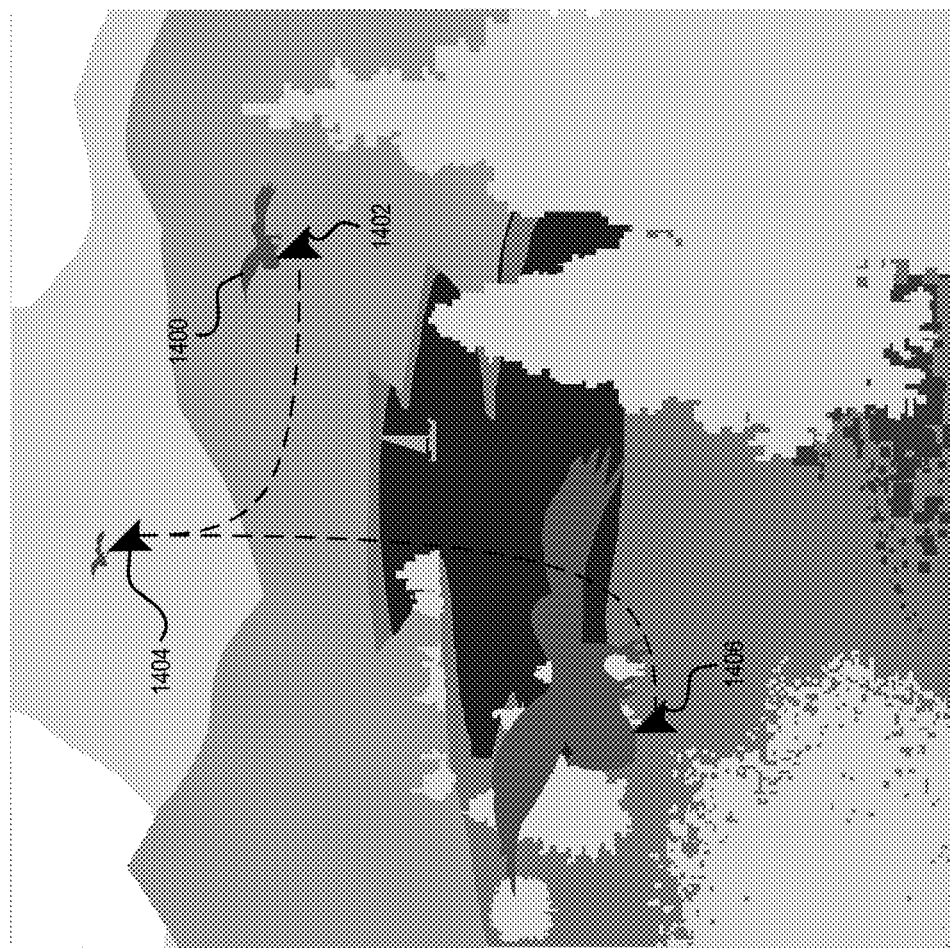
FIG. 14 illustrates an alternative example of automatic sizing of new content in accordance with one or more embodiments.

FIG. 14 illustrates an alternative example of overriding content linting rules in accordance with one or more embodiments. As shown in FIG. 14, in some embodiments, the content is dynamically resized based on the user's cursor location as the content is being added to the canvas. In this example, a bird 1400 is added to the canvas. As discussed, the bird can be a 3D model added from a content library and the appearance of the bird can be generated upon placement. Although the canvas only shows a layer map, in various embodiments, the graphic design system includes a layer canvas and a content canvas, as illustrated in previous examples. Alternatively, the graphic design system may only include a content canvas which shows the rendered content.

As the user moves their cursor to different positions, the placement context can be dynamically determined and used to resize the object appropriately. For example, when starting at position 1402, the placement context includes that the bird is positioned over a mountain layer and near tree object. The bird may therefore be sized based on the nearby objects, such that it appears to be a realistic size for the area in which it is flying. As the user drags their cursor over the canvas, the placement context changes, and the bird's properties are updated. For example, at position 1404, the bird is over a sky layer and is not particularly close to any other objects. As such, the bird may be reduced in size to represent a bird flying at a farther distance from the viewer. Similarly, when repositioned to position 1406, the bird is now much closer to the viewer in the foreground and is increased in size.

Figure 15:
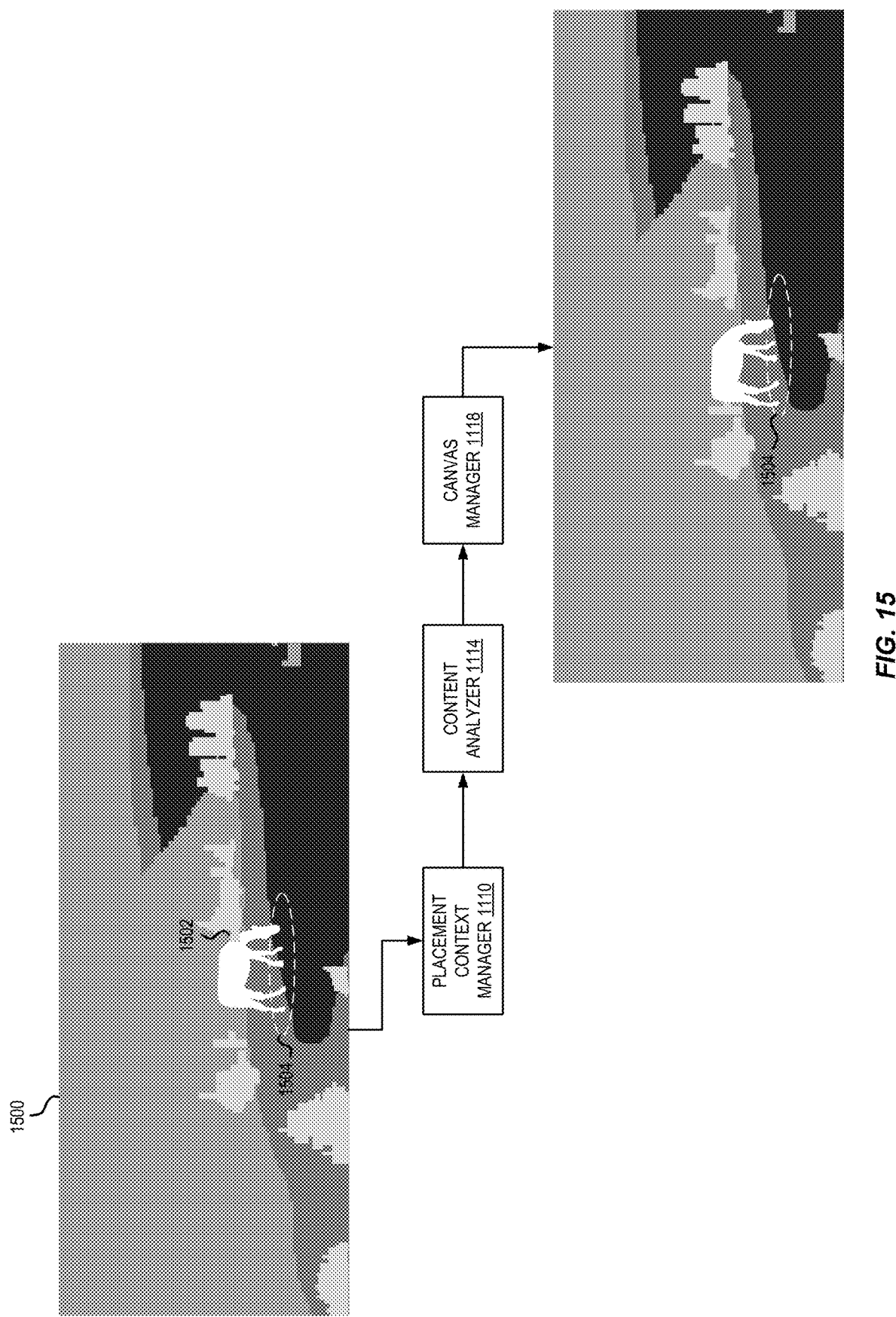
FIG. 15 illustrates an example of content linting in a graphic design application in accordance with one or more embodiments.

FIG. 15 illustrates an example of content linting in a graphic design application in accordance with one or more embodiments. As discussed, content linting enables small errors in a drawing to be detected and corrected that may otherwise be difficult for the user to identify. For example, a horse object in the background of the example drawings that have been discussed is shown in drawing segment 1500. The horse is shown drinking from the lake. However, the horse is partially obscured by a bush that should be in the background, as shown at 1502. Additionally, the horse is partially standing on top of the lake, rather than on the shoreline, as shown at 1504.

When the horse is added to the drawing, a placement context is generated for the horse by placement context manager 1110, as discussed. In this example, the placement context can include the nearby bush layer, shore layer, and lake layer. In some embodiments, the placement context can be generated based on the layer data and/or a semantic scene graph (e.g., semantic hierarchy) that represents the content and/or layers of the drawing. The content analyzer 1114 can analyze the placement context and identify that the horse object is partially on top of the lake layer. The content rules can define classes of objects that can realistically be depicted on top of a water layer (e.g., boats, skiers, fish, birds, etc.) and classes of objects that generally are not realistically depicted on top of a water layer (e.g., terrestrial animals, people, land vehicles, etc.). As such, the content analyzer can determine a distance in pixels to move the horse such that it is not partially over the lake. Additionally, the content analyzer can determine that the z-order of the horse and the bushes is inconsistent with their relative positions and determine an updated z-order to place the horse in front of the bush layer.

The content rules can be coarse or fine grained depending on the amount of semantic information available. For example, the semantic class for the horse may be more specific than just "horse." For example, the horse may be classified as "drinking horse" or other label that indicates the action the horse is depicted as performing. In such instances, the content analyzer can determine a distance to move the horse such that only its head is over the lake. Similarly, if the horse was classified as "grazing horse," then the content analyzer can determine a distance to move the horse such that it is entirely over a ground layer (e.g., grass, shore, dirt, etc.) and not over a water layer.

With the changes identified by the content analyzer 1114, the canvas manager 1118 can then apply those changes to the horse on the canvas. For example, as shown at 1506, the horse has been moved to the left such that it is no longer over the lake. Additionally, the z-order has been updated so that the horse is not behind the bushes.

Figure 16:
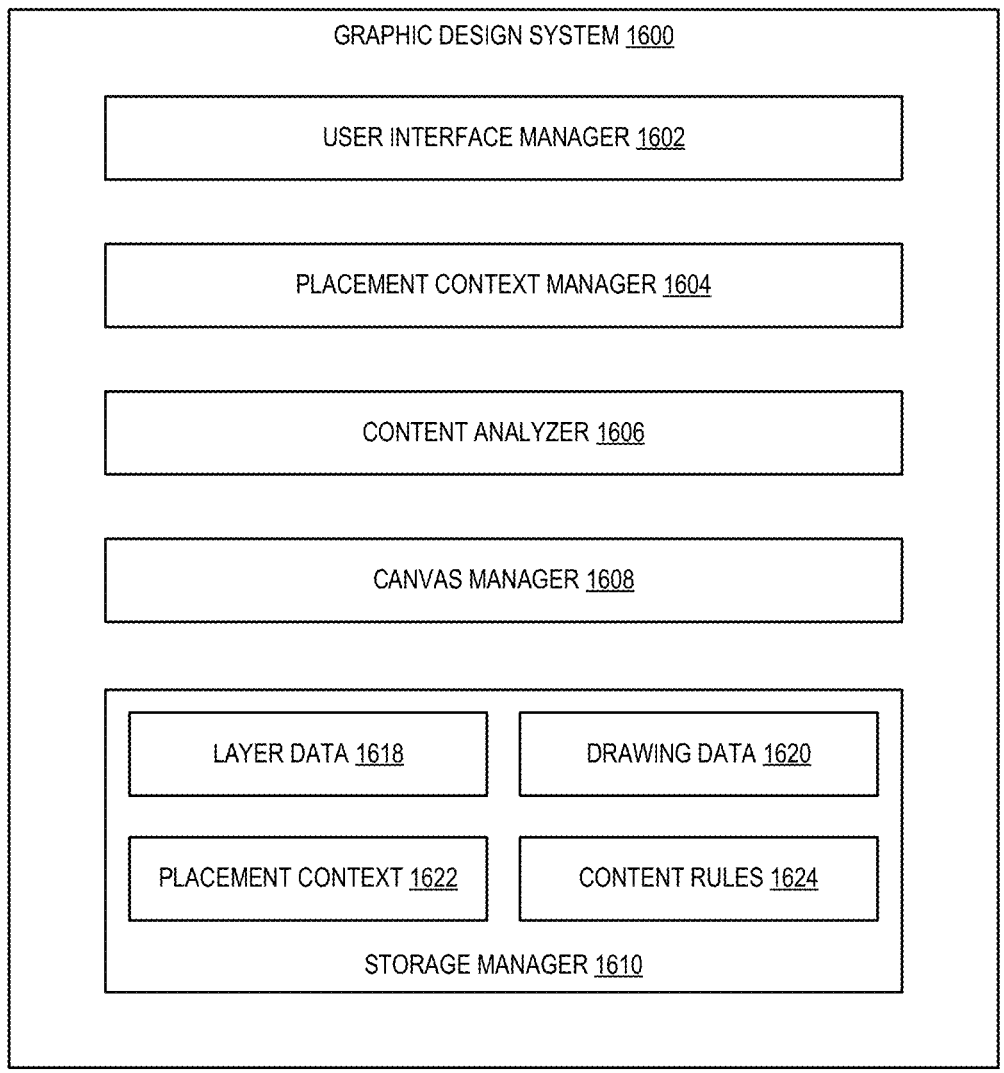
FIG. 16 illustrates a schematic diagram of a graphic design system in accordance with one or more embodiments.

FIG. 16 illustrates a schematic diagram of graphic design system (e.g., "graphic design system" described above) in accordance with one or more embodiments. As shown, the graphic design system 1600 may include, but is not limited to, user interface manager 1602, placement context manager 1604, content analyzer 1606, canvas manager 1608, and storage manager 1610. The storage manager 1610 includes layer data 1618, drawing data 1620, placement context data 1622, and content rules 1624. In some embodiments, graphic design system 1600 further includes some or all of the components described at least with respect to graphic design system 900.

As illustrated in FIG. 16, the graphic design system 1600 includes a user interface manager 1602. For example, the user interface manager 1602 allows users to request content to be generated and added to a canvas provided by the graphic design system 1600. This includes providing tool access through one or more user interface panels, menus, or other user interface elements. Additionally, the user can create and edit drawings directly on the canvas by painting content textures, dragging and dropping objects, and/or directly editing the canvas using provided drawing tools. In some embodiments, the user interface manager 1602 provides a user interface through which the user can select content textures and objects, drawing tools, etc., as discussed above. Alternatively, or additionally, the user interface enables the user to open and edit existing drawings from a local or remote storage location (e.g., by providing an address (e.g., a URL or other endpoint) associated with a document store). In some embodiments, the user interface presents content linting changes to correct errors to the user via the user interface manager 1602 which the user can choose to accept or reject. Alternatively, the user interface manager 1602 enables the user to roll back changes that were made automatically in response to detected errors.

As illustrated in FIG. 16, the graphic design system 1600 also includes placement context manager 1604. As discussed, placement context manager 1604 is responsible for generating a placement context 1622 which includes data associated with a placement location of new content on a canvas. The placement selection can include a location on a digital canvas where the content is being added (e.g., a region being painted with a content texture, a location of a cursor where an object is being inserted, etc.). The placement context includes the location on the digital canvas along with information about that location obtained from layer data 1618, such as information about the relative positioning of layers on the canvas (e.g., nearby layers) and z-order of the layers. In some embodiments, the placement context manager looks up the placement location in the layer data to identify nearby layers and their associated content. The placement context may then be a data structure that includes the layer and content information associated with the placement location.

As illustrated in FIG. 16, the graphic design system 1600 also includes content analyzer 1606. Content analyzer 1606 applies content rules 1624 to the placement context generated by placement context manager 1604 to identify errors in the document. As discussed, the content rules 1624 can include size (e.g., scale) rules, alignment (e.g., orientation) rules, etc. For example, size rules define a range of sizes of content types that are consistent with the content types. The rules can be defined relatively (e.g., the size of one content type is dependent on the size of a content type that has already been added to the drawing). Similarly, alignment rules define how content should be aligned with other content. For example, new content has associated properties. When an object (e.g., a 3D model) is added to the document, its size, orientation, appearance, etc. are stored (e.g., as object and/or document metadata). Such properties are recorded for all content as it is added to the document. The properties of new content can be compared to the properties of content referenced in the placement context (e.g., the alignment property of an object compared to the alignment of a related layer, etc.). The content rules 1624 can define ranges of acceptable property values (or differences in property values) between different types of content. By applying the content rules 1624 to the content, content analyzer 1606 can identify properties that are not valid, according to the content rules, and can identify changes to be made to the content to make the content valid.

As illustrated in FIG. 16, the graphic design system 1600 also includes canvas manager 1608. As discussed, canvas manager receives a request for new content from the user via user interface manager 1602 and coordinates creation of a new semantic layer corresponding to the content and generation of the content by content generation model 1614. Additionally, the canvas manager can receive a content analysis from content analyzer 1606 that identifies changes to be made to the content on the canvas such that it complies with content rules 1624. In some embodiments, the canvas manager automatically applies the changes to the associated content, as discussed above. Alternatively, the changes are first presented to the user, via user interface manager 1602, to either accept or reject before the canvas manager 1608 applies the changes to the drawing. Once updated, the updated drawing can be stored in drawing data 1620.

As illustrated in FIG. 16, the graphic design system 1600 also includes the storage manager 1610. The storage manager 1610 maintains data for the graphic design system 1600. The storage manager 1610 can maintain data of any type, size, or kind as necessary to perform the functions of the graphic design system 1600. The storage manager 1610, as shown in FIG. 16, includes the layer data 1618. The layer data 1618 can include semantic information associated with the layers of a drawing, as discussed in additional detail above. In particular, in one or more embodiments, the layer data 1618 includes semantic information associated with the type of content represented in each layer. In some embodiments, the layer data includes information about the relative positioning of the layer on the canvas (e.g., nearby layers) and z-order of the layers. In some embodiments, the layer data is represented as a semantic hierarchy (also referred to as a semantic scene graph), as discussed further below. The storage manager 1610 also includes drawing data 1620. The drawing data 1620 can include drawing files created, or editable, by graphic design system 1600.

Additionally, the storage manager 1610 includes placement context 1622. As discussed, the placement context includes layer and content information associated with particular coordinates on a digital canvas. In some embodiments, the placement context is generated by the placement context manager when new content is added and discarded after use. Alternatively, a placement context 1622 is maintained for each piece of content added to the digital canvas and updated as the content is changed, moved, etc. The storage manager 1610 also includes content rules 1624. The content rules 1624 include size (e.g., scale) rules, alignment (e.g., orientation) rules, etc. For example, size rules define a range of sizes of content types that are consistent with the content types. The rules can be defined relatively (e.g., the size of one content type is dependent on the size of a content type that has already been added to the drawing). Similarly, alignment rules define how content should be aligned with other content.

Each of the components 1602-1610 of the graphic design system 1600 and their corresponding elements (as shown in FIG. 16) may be in communication with one another using any suitable communication technologies. It will be recognized that although components 1602-1612 and their corresponding elements are shown to be separate in FIG. 16, any of components 1602-1612 and their corresponding elements may be combined into fewer components, such as into a single facility or module, divided into more components, or configured into different components as may serve a particular embodiment.

The components 1602-1612 and their corresponding elements can comprise software, hardware, or both. For example, the components 1602-1612 and their corresponding elements can comprise one or more instructions stored on a computer-readable storage medium and executable by processors of one or more computing devices. When executed by the one or more processors, the computer-executable instructions of the graphic design system 1600 can cause a client device and/or a server device to perform the methods described herein. Alternatively, the components 1602-1612 and their corresponding elements can comprise hardware, such as a special purpose processing device to perform a certain function or group of functions. Additionally, the components 1602-1612 and their corresponding elements can comprise a combination of computer-executable instructions and hardware.

Furthermore, the components 1602-1612 of the graphic design system 1600 may, for example, be implemented as one or more stand-alone applications, as one or more modules of an application, as one or more plug-ins, as one or more library functions or functions that may be called by other applications, and/or as a cloud-computing model. Thus, the components 1602-1612 of the graphic design system 1600 may be implemented as a stand-alone application, such as a desktop or mobile application. Furthermore, the components 1602-1612 of the graphic design system 1600 may be implemented as one or more web-based applications hosted on a remote server. Alternatively, or additionally, the components of the graphic design system 1600 may be implemented in a suit of mobile device applications or "apps." To illustrate, the components of the graphic design system 1600 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN.

"ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 17:
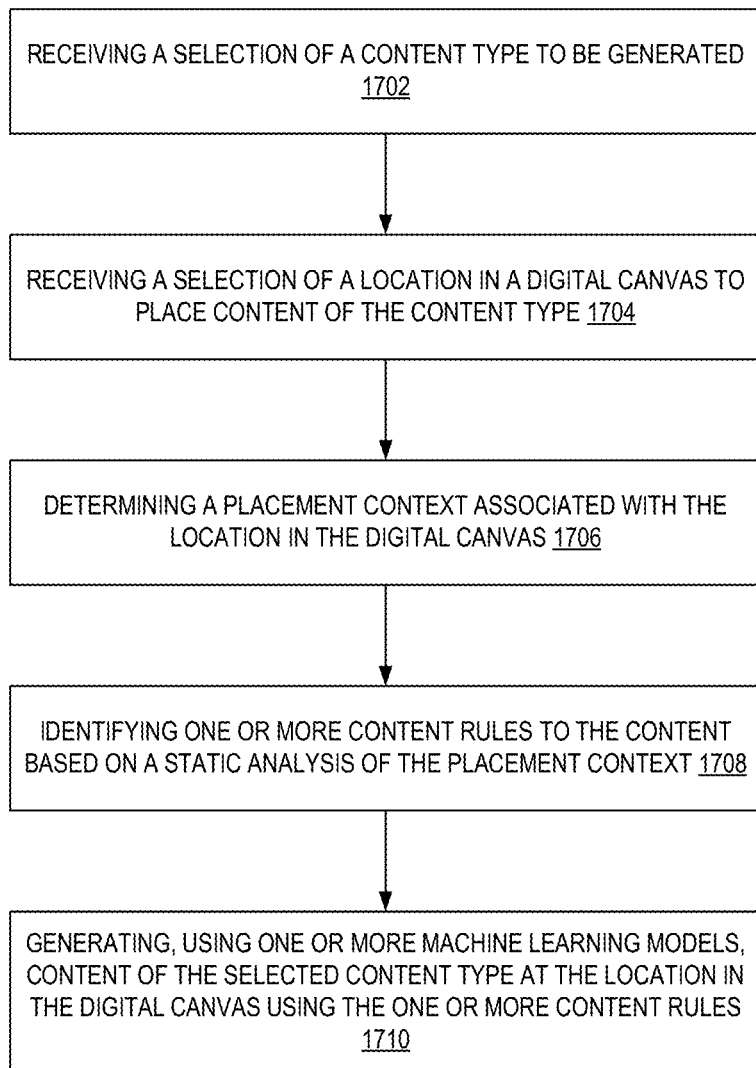
FIG. 17 illustrates a flowchart of a series of acts in a method of content linting based on semantic information in accordance with one or more embodiments.

FIGS. 11-16, the corresponding text, and the examples, provide a number of different systems and devices that allows for creation and management of semantic layers in a drawing document. In addition to the foregoing, embodiments can also be described in terms of flowcharts comprising acts and steps in a method for accomplishing a particular result. For example, FIG. 17 illustrates a flowchart of an exemplary method in accordance with one or more embodiments. The method described in relation to FIG. 17 may be performed with fewer or more steps/acts or the steps/acts may be performed in differing orders. Additionally, the steps/acts described herein may be repeated or performed in parallel with one another or in parallel with different instances of the same or similar steps/acts.

FIG. 17 illustrates a flowchart of a series of acts in a method 1700 of content linting based on semantic information in accordance with one or more embodiments. In one or more embodiments, the method 1700 is performed in a digital medium environment that includes the graphic design system 1600. The method 1700 is intended to be illustrative of one or more methods in accordance with the present disclosure and is not intended to limit potential embodiments. Alternative embodiments can include additional, fewer, or different steps than those articulated in FIG. 17.

As illustrated in FIG. 17, the method 1700 includes an act 1702 of receiving a selection of a content type to be generated. As discussed, a graphic design system's user interface can provide a variety of content types to the user. The selection may be made via a user interface manager of the graphic design system. Some content types include content textures, which enable the user to paint an area of a digital canvas with a content type (e.g., cloud, sky, dirt, ocean, etc.) and corresponding content is then generated by a machine learning model. Additionally, content can include object models, such as animals, trees, vehicles, people, etc., which can be selected and then dragged and dropped (or otherwise added) to the digital canvas.

As illustrated in FIG. 17, the method 1700 includes an act 1704 of receiving a selection of a location in a digital canvas to place content of the content type. As discussed, the selection may be made through the user interface manager of the graphic design system. For example, a region of the digital canvas can be painted by the user (e.g., selecting a drawing tool and the selected content type and then drawing over a region to select it). Alternatively, an object can be dropped to a specific location on the digital canvas.

As illustrated in FIG. 17, the method 1700 includes an act 1706 of determining a placement context associated with the location in the digital canvas. As discussed, the placement context includes information about layers and/or content that is close to the selected location in the digital canvas. For example, multiple layers may exist at a given coordinate (or within a threshold distance of the coordinate) and the semantic information associated with each of these layers can be added to the placement context. Additionally, properties associated with the content (e.g., appearance, location, orientation, etc.) may also be added to the placement context. In some embodiments, the placement context includes one or more of the content type, one or more content types near the location (e.g., spatially adjacent content and/or layers), existing layers associated with the location, or layer z-order. In some embodiments, the method further includes identifying the at least one spatially adjacent layer based at least on a semantic hierarchy of layers (e.g., discussed further below) of the digital canvas.

As illustrated in FIG. 17, the method 1700 includes an act 1708 of identifying one or more content rules to the content based on a static analysis of the placement context. For example, the content rules can include size rules, alignment rules, etc. In some embodiments, identifying one or more content rules includes identifying a size content rule associated with the content, and determining, using the size content rule, a default size of the content at the location based on the placement context.

As illustrated in FIG. 17, the method 1700 includes an act 1710 of generating, using one or more machine learning models, content of the selected content type at the location in the digital canvas using the one or more content rules. As discussed, a canvas manager can send a request to a content generation model to generate corresponding content. The request can include the content type and the area to be filled. This can include requested updated content that conforms to the content rules. For example, if an object is realigned in the scene, then a new appearance of the now realigned object can be generated.

In some embodiments, content rules can be applied to content before it has been placed on the digital canvas. For example, the user can drag an object from a content panel of the user interface onto the canvas, traversing various locations on the canvas in the process. As the object moves, a new placement context can be generated, and content can be modified accordingly. For example, the method further includes receiving a selection of a new location based on a change in cursor position, and determining a new default size of the content based on the size content rule and the new location. In some embodiments, the content rules can be overridden by the user. For example, in some embodiments, the method further includes receiving a selection of a size of the content, and overriding the size content rule based on the selection of the size.

In some embodiments, identifying one or more content rules further includes identifying an alignment rule associated with the content and at least one spatially adjacent layer of the digital canvas, and determining one or more alignment parameters to align the content with the at least one spatially adjacent layer.

A scene graph is a data structure that provides a representation of the content of a scene. Nodes of the graph can represent objects in the scene and connections between the nodes can indicate relationships (e.g., logical, spatial, etc.) between connected objects. However, conventional graphic design applications include very little, if any, information about the content being created. Such conventional systems are typically limited to pixel values (e.g., color, transparency, etc.), properties of vector graphics (e.g., line width, fill, curve parameters, etc.) without any semantic understanding. This makes content linting (e.g., validation) difficult if not impossible, as there is little context to be used for determining whether there are errors in the drawing. As such, the system typically does not have any information about what objects are represented in the scene or how they are related. Additionally, in raster graphics editors, it is often unknown to the system what should be considered an object at all. This makes it difficult or impossible to construct such a scene graph in conventional systems.

Semantic drawing tools include information about the content included therein. For example, content can be added to semantic layers which also include semantic information about the content (e.g., the content type, relative position to other layers or content, etc.). As a result, a semantic understanding of the drawing as a whole can be obtained. This semantic information can be used to generate a semantic scene graph that can be constructed as the drawing is created by the user. Having a semantic scene graph simplifies editing and management of the drawing, particularly by multiple users. For example, the semantic scene graph provides a summary of the scene that makes it is easier for an unfamiliar user to understand the drawing. Additionally, changes made to the drawing by different users can be reflected in differences between two scene graphs. The scene graph is also useful for selecting content to be edited by selecting the content from the graph rather than on the canvas directly.

Figure 18:
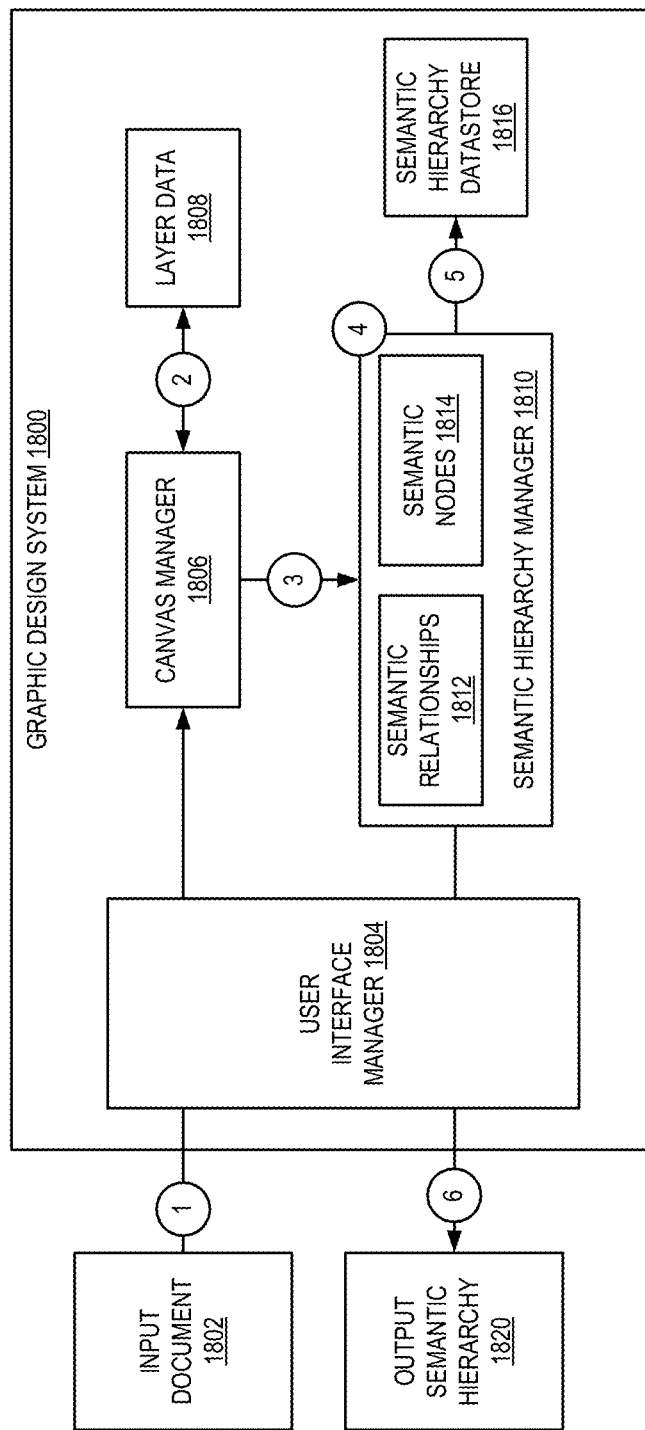
FIG. 18 illustrates a diagram of a process of hierarchical semantic layer organization in accordance with one or more embodiments.

FIG. 18 illustrates a diagram of a process of hierarchical semantic layer organization in accordance with one or more embodiments. Graphic design system 1800 can be implemented similarly to graphic design systems 100 and 1100, described above. As shown in FIG. 18, a graphic design system 1800 can receive an input document 1802, at numeral 1. The input document can be a preexisting drawing document or a new drawing document that the user is creating. In some embodiments, the user can provide input document 1802 via user interface manager 1804. For example, user interface manager 1804 provides a user interface for the graphic design system 1800. The user interface can include user interface elements enabling the user to request to open an existing document (e.g., from a local or remote storage location) or create a new document.

In some embodiments, the user requests a semantic scene graph to be generated for the input document 1802. Alternatively, a semantic scene graph is generated for the document automatically once it is opened by graphic design system 1800. In some embodiments, canvas manager 1806 can obtain layer data associated with the input document at numeral 2. For example, as discussed, the layer data includes, semantic information associated with the layers, information about the relative positioning of layers on the canvas (e.g., nearby layers) and z-order of the layers, as discussed above. The layer data can be retrieved for an existing document or may be generated as the drawing is created, as discussed above.

At numeral 3, the layer data associated with the input document is provided to semantic hierarchy manager 1810. At numeral 4, the semantic hierarchy manager 1810 can identify semantic relationships 1812 and semantic nodes 1814 among the layer data. For example, semantic nodes include each instance of a semantic class represented in the scene. In some embodiments, each semantic layer corresponds to a particular object or content type. In such instances, there is at least a one-to-one relationship between layers and semantic nodes. In some embodiments, the layer data includes groups of layers, where each layer in the group corresponds to the same content type. For example, a scene including a forest may include many trees and each tree may be an object having its own layer. These tree layers can be grouped into a tree group. Additionally, spatial relationships between layers can also be represented in the layer data. For example, cloud layers being placed on top of a sky layer, tree layers on top of a ground layer, etc. The semantic hierarchy manager can represent these as semantic relationships 1812 which connect the semantic nodes to form the semantic hierarchy (e.g., a semantic scene graph).

At numeral 5, the semantic scene graph (e.g., the semantic relationships and semantic nodes) can be stored in semantic hierarchy datastore 1816. Alternatively, the semantic hierarchy can be stored with layer data 1808. At numeral 6, the semantic hierarchy 1820 can be returned to be show to the user via user interface manager 1804. In some embodiments, the user interface can include a semantic hierarchy panel which visualizes the graph for the user. The user can interact with the graph to select specific layers, identify unintended or incorrect semantic relationships, or otherwise manage the drawing. Additionally, the semantic graph can be used by the graphic design system for other enhancements. For example, the semantic scene graph can be used during content linting to identify related layers.

Figure 19:
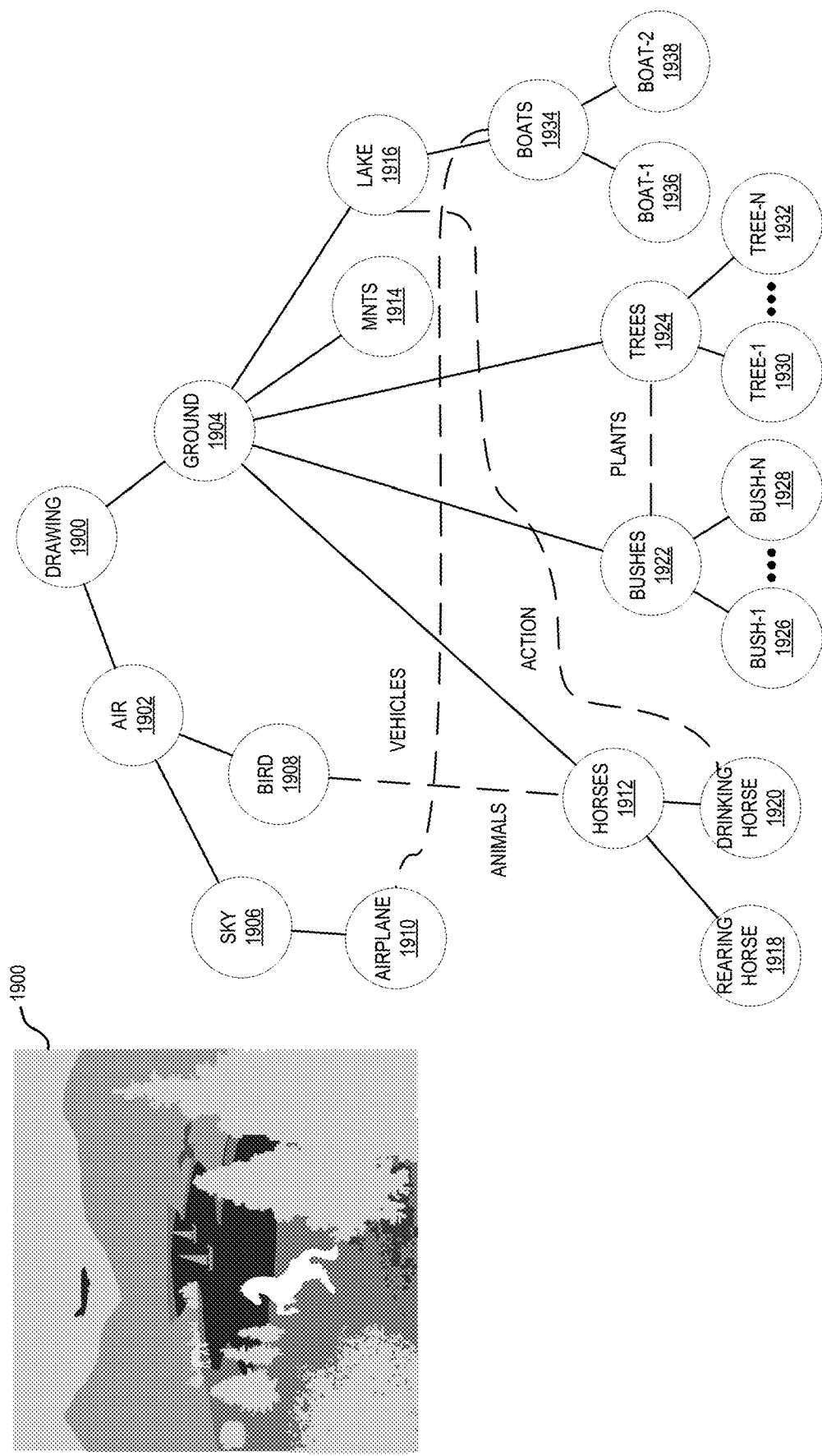
FIG. 19 illustrates an example of a semantic scene graph in accordance with one or more embodiments.

FIG. 19 illustrates an example of a semantic scene graph in accordance with one or more embodiments. As discussed, a semantic scene graph can be a data structure including a plurality of nodes connected by a plurality of connections. Each node represents a different semantic class depicted in the drawing and each connection includes spatial and/or semantic relationships between the nodes. As shown in FIG. 19, a semantic scene graph is generated for a drawing 1900, where the root node of the semantic scene graph is the drawing it represents.

In the example of FIG. 19, the drawing is a landscape, which includes air components and ground components. As such, the first layer of nodes in the example semantic scene graph of FIG. 19 includes an air node 1902 and a ground node 1904. The air node 1902 has relationships with layers that represent elements in the air, such as the sky layer (represented by sky node 1906) which depicts the sky in the drawing 1900 and a bird node 1908 representing the bird in the drawing. The bird node represents a bird in flight, and is therefore organized with the air node. A bird that is perched might be organized with the tree or structure on which it is perched, etc. Similarly, airplane node 1910, representing the depicted airplane, is linked to the sky node 1906 as it is depicted on the sky layer and is in-flight.

The ground node 1904 has relationships with various layers connected to the ground, such as horses 1912, mountains 1914, and lake 1916. In some embodiments, additional or fewer nodes may be used to represent the layers in the drawing 1900. For example, ground 1904 may be further divided into additional layers such as grass, rocks, etc. each with their own corresponding nodes. Horses 1912 is linked to a rearing horse 1918 and a drinking horse 1920. Each edge connecting the horses to the horse node can include spatial information about the horses, such as coordinates in the drawing associated with each horse. In some embodiments, an additional connection is made between the drinking horse node 1920 and the lake node 1916 where the edge includes spatial information linking the drinking horse to a position in the lake. Similarly, in some embodiments, the bird node 1908 and horses node 1912 are further linked together because they both represent members of the animal class.

The ground can be linked to additional layers corresponding to additional objects on the ground, such as bushes 1922 and trees 1924. These nodes may represent groupings of layers belonging to that same class. For example, each bush in the drawing 1900 may have a corresponding layer, and node 1926-1928 in the semantic scene graph. Likewise, each tree in the drawing 1900 may have a corresponding layer and node 1930-1932 in the semantic scene graph. The bushes node 1922 and trees node 1924 can also be linked as belonging to the plants class. Additionally, the lake node 1916 is linked to the boats on the lake. This includes boats node 1934 which is linked to boat-1 1936 and boat-2 1938. As discussed, the edges connecting these boats to the boats node 1934 can include information about how the boats are related to the lake, such as coordinates in the drawing. Additionally, the boats node 1934 can be connected to the airplane node 1910 as both belonging to the vehicles class.

Figure 20:
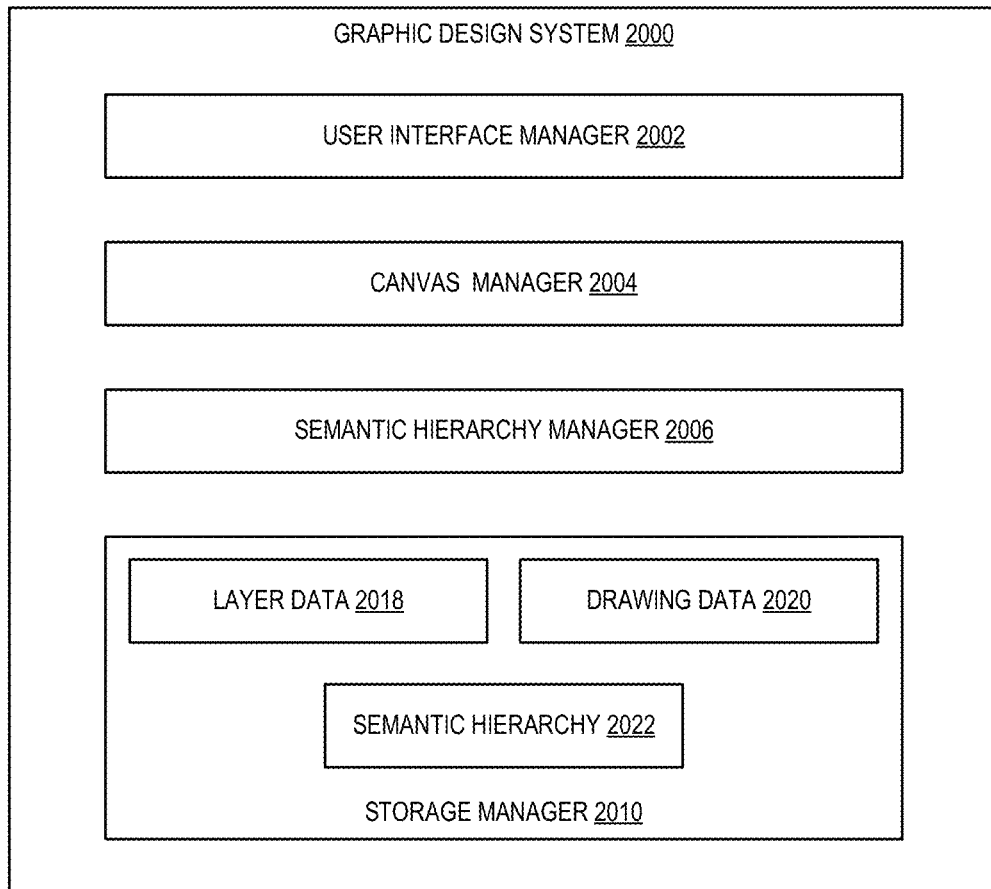
FIG. 20 illustrates a schematic diagram of a graphic design system in accordance with one or more embodiments.

FIG. 20 illustrates a schematic diagram of graphic design system (e.g., "graphic design system" described above) in accordance with one or more embodiments. As shown, the graphic design system 2000 may include, but is not limited to, user interface manager 2002, canvas manager 2004, semantic hierarchy manager 2006, and storage manager 2010. The storage manager 2010 includes layer data 2018, drawing data 2020, and semantic hierarchy data 2022. In some embodiments, graphic design system 2000 further includes some or all of the components described at least with respect to graphic design systems 900 and 1600.

As illustrated in FIG. 20, the graphic design system 2000 includes a user interface manager 2002. For example, the user interface manager 2002 allows users to request content to be generated and added to a canvas provided by the graphic design system 2000. This includes providing tool access through one or more user interface panels, menus, or other user interface elements. Additionally, the user can create and edit drawings directly on the canvas by painting content textures, dragging and dropping objects, and/or directly editing the canvas using provided drawing tools. In some embodiments, the user interface manager 2002 provides a user interface through which the user can select content textures and objects, drawing tools, etc., as discussed above. Alternatively, or additionally, the user interface enables the user to open and edit existing drawings from a local or remote storage location (e.g., by providing an address (e.g., a URL or other endpoint) associated with a document store). Additionally, the user interface manager receives a request to generate a semantic hierarchy 2022 (e.g., a semantic scene graph) for an input document (e.g., a drawing, etc.). In some embodiments, the semantic hierarchy is generated as the drawing is created. Alternatively, an existing document is opened using the user interface manager 2002 (e.g., selecting a user interface element to open an existing document). When the document is opened, or upon request by the user, a request is provided to the canvas manager 2004 to orchestrate creation of the semantic hierarchy.

As illustrated in FIG. 20, the graphic design system 2000 also includes canvas manager 2004. As discussed, canvas manager orchestrates generation of a semantic hierarchy for a document. For example, as discussed above, the canvas manager 2004 receives a request for new content from the user via user interface manager 2002 and coordinates creation of a new semantic layer corresponding to the content and generation of the content using a content generation mode, content library, etc., as discussed above. As discussed, as content is added to the drawing, new semantic layers are created which include semantic information associated with the new content. For existing documents, the canvas manager can obtain layer data 2018 associated with the input document via storage service 2010. For example, as discussed, the layer data includes, semantic information associated with the layers, information about the relative positioning of layers on the canvas (e.g., nearby layers) and z-order of the layers, as discussed above. The layer data can be retrieved for an existing document or may be generated as the drawing is created, as discussed above.

As illustrated in FIG. 20, the graphic design system 2000 also includes the semantic hierarchy manager 2006. The semantic hierarchy manager 2006 then uses the layer data obtained from the canvas manager 2004 to generate the semantic hierarchy 2022. For example, the semantic hierarchy manager 2006 can identify semantic relationships and semantic nodes among the layer data. For example, semantic nodes include each instance of a semantic class represented in the scene. The nodes may correspond to each semantic layer, groups of semantic layers, etc., or classes to which multiple semantic layers belong. As discussed, each semantic layer may correspond to a particular object or content type. In such instances, there is at least a one-to-one relationship between layers and semantic nodes. In some embodiments, the layer data includes groups of layers, where each layer in the group corresponds to the same content type. Relationships between the nodes (e.g., between content depicted in the drawing) can be encoded as edges connecting related nodes. For example, drawing coordinates corresponding to locations in the drawing where an object overlaps another layer can be stored as properties of an edge connecting a node representing the object to a node representing the layer.

As illustrated in FIG. 20, the graphic design system 2000 also includes the storage manager 2010. The storage manager 2010 maintains data for the graphic design system 2000. The storage manager 2010 can maintain data of any type, size, or kind as necessary to perform the functions of the graphic design system 2000. The storage manager 2010, as shown in FIG. 20, includes the layer data 2018. The layer data 2018 can include semantic information associated with the layers of a drawing, as discussed in additional detail above. In particular, in one or more embodiments, the layer data 2018 includes semantic information associated with the type of content represented in each layer. In some embodiments, the layer data includes information about the relative positioning of the layer on the canvas (e.g., nearby layers) and z-order of the layers. The storage manager 2010 also includes drawing data 2020. The drawing data 2020 can include drawing files created, or editable, by graphic design system 2000.

Additionally, the storage manager 2010 also includes the semantic hierarchy 2022. As discussed, the semantic hierarchy 2022 (e.g., semantic scene graph) can be a data structure which represents a drawing generated using, or readable by, graphic design system 2000. The semantic hierarchy 2022 can include a plurality of nodes connected by a plurality of edges. As discussed, the plurality of nodes each represent a semantic class corresponding to content in the drawing. For example, some nodes represent specific semantic layers, other nodes may represent a class to which multiple semantic layers below, etc. The edges include information that links the nodes. For example, relationships between content (e.g., spatial, logical, etc.) can be associated with the edges.

Each of the components 2002-2010 of the graphic design system 2000 and their corresponding elements (as shown in FIG. 20) may be in communication with one another using any suitable communication technologies. It will be recognized that although components 2002-2012 and their corresponding elements are shown to be separate in FIG. 20, any of components 2002-2012 and their corresponding elements may be combined into fewer components, such as into a single facility or module, divided into more components, or configured into different components as may serve a particular embodiment.

The components 2002-2012 and their corresponding elements can comprise software, hardware, or both. For example, the components 2002-2012 and their corresponding elements can comprise one or more instructions stored on a computer-readable storage medium and executable by processors of one or more computing devices. When executed by the one or more processors, the computer-executable instructions of the graphic design system 2000 can cause a client device and/or a server device to perform the methods described herein. Alternatively, the components 2002-2012 and their corresponding elements can comprise hardware, such as a special purpose processing device to perform a certain function or group of functions. Additionally, the components 2002-2012 and their corresponding elements can comprise a combination of computer-executable instructions and hardware.

Furthermore, the components 2002-2012 of the graphic design system 2000 may, for example, be implemented as one or more stand-alone applications, as one or more modules of an application, as one or more plug-ins, as one or more library functions or functions that may be called by other applications, and/or as a cloud-computing model. Thus, the components 2002-2012 of the graphic design system 2000 may be implemented as a stand-alone application, such as a desktop or mobile application. Furthermore, the components 2002-2012 of the graphic design system 2000 may be implemented as one or more web-based applications hosted on a remote server. Alternatively, or additionally, the components of the graphic design system 2000 may be implemented in a suit of mobile device applications or "apps." To illustrate, the components of the graphic design system 2000 may be implemented as part of an application, or suite of applications, including but not limited to ADOBE CREATIVE CLOUD, ADOBE PHOTO SHOP, ADOBE ACROBAT, ADOBE ILLUSTRATOR, ADOBE LIGHTROOM and ADOBE INDESIGN. "ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 21:
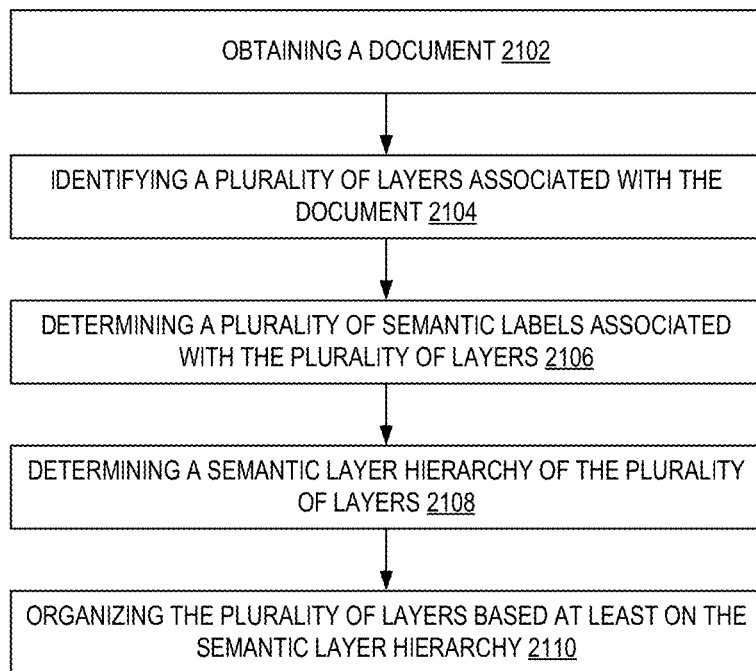
FIG. 21 illustrates a flowchart of a series of acts in a method of hierarchical semantic layer organization in accordance with one or more embodiments.

FIGS. 18-20, the corresponding text, and the examples, provide a number of different systems and devices that allows for creation and management of semantic layers in a drawing document. In addition to the foregoing, embodiments can also be described in terms of flowcharts comprising acts and steps in a method for accomplishing a particular result. For example, FIG. 21 illustrates a flowchart of an exemplary method in accordance with one or more embodiments. The method described in relation to FIG. 21 may be performed with fewer or more steps/acts or the steps/acts may be performed in differing orders. Additionally, the steps/acts described herein may be repeated or performed in parallel with one another or in parallel with different instances of the same or similar steps/acts.

FIG. 21 illustrates a flowchart of a series of acts in a method 2100 of hierarchical semantic layer organization in accordance with one or more embodiments. In one or more embodiments, the method 2100 is performed in a digital medium environment that includes the graphic design system 2000. The method 2100 is intended to be illustrative of one or more methods in accordance with the present disclosure and is not intended to limit potential embodiments. Alternative embodiments can include additional, fewer, or different steps than those articulated in FIG. 21.

As illustrated in FIG. 21, the method 2100 includes an act 2102 of obtaining a document. For example, as discussed, a user interface manager can receive a request to open an existing document (e.g., from a local or remote storage location). Additionally, or alternatively, a new document can be created. As discussed, the document is a graphic design document (e.g., a drawing), such as a raster drawing, vector drawing, etc.

As illustrated in FIG. 21, the method 2100 includes an act 2104 of identifying a plurality of layers associated with the document. For example, the graphic design system can maintain layer data associated with the document. In some embodiments, the layer data may be metadata included with the document data, stored separately by the graphic design system, or otherwise associated with the document and accessible by the graphic design system.

As illustrated in FIG. 21, the method 2100 includes an act 2106 of determining a plurality of semantic labels associated with the plurality of layers. As discussed, semantic drawing tools can create semantic layers for content as it is added to the document. The semantic layers can include semantic information associated with the content in the layer, relationships with content in other layers, etc. In various embodiments, the semantic labels are determined from the semantic information associated with the document. In some embodiments, determining a plurality of semantic labels associated with the plurality of layers, further includes annotating, by a machine learning model trained to generate a semantic label for content associated with a layer, each layer of the plurality of layers with its corresponding semantic label.

As illustrated in FIG. 21, the method 2100 includes an act 2108 of determining a semantic layer hierarchy of the plurality of layers. In some embodiments, determining the semantic layer hierarchy includes determining semantic relationships between the plurality of layers based on the corresponding semantic labels. In some embodiments, the semantic relationships are included in the semantic information associated with the semantic layers. Alternatively, semantic rules or other information may define how semantic classes are related to one another.

As illustrated in FIG. 21, the method 2100 includes an act 2110 of organizing the plurality of layers based at least on the semantic layer hierarchy. In some embodiments, organizing the plurality of layers based at least on the semantic layer hierarchy includes identifying semantically similar layers based on their corresponding semantic labels, and creating a group of layers that includes the semantically similar layers, each group associated with a group label. In some embodiments, the method further includes identifying semantically similar groups based on their corresponding group labels, and creating a group of groups that includes the semantically similar groups. In some embodiments, organizing the plurality of layers further includes determining a z-order of the plurality of layers based on the semantic layer hierarchy; and storing the z-order in the semantic layer hierarchy.

In some embodiments, the method further includes receiving a selection of a content type to be generated, receiving a selection of a location in a digital canvas of the document to place content of the content type, generating, using one or more machine learning models, content of the selected content type at the location in the digital canvas, and adding the content to a new layer of the document, wherein the new layer is associated with a semantic label corresponding to the content type. In some embodiments, the method further includes updating the semantic layer hierarchy based at least on the new layer.

Figure 22:
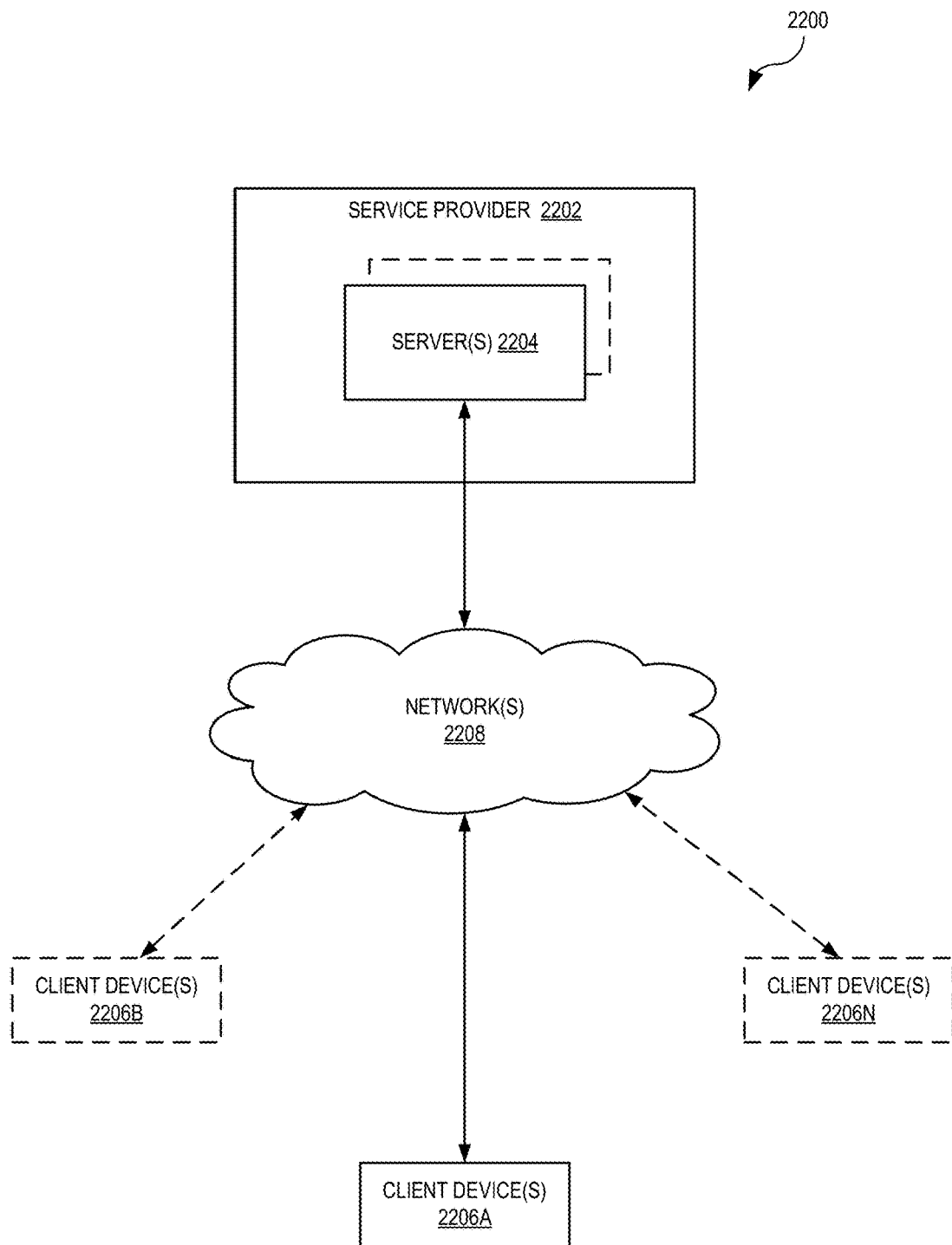
FIG. 22 illustrates a schematic diagram of an exemplary environment in which the image processing system can operate in accordance with one or more embodiments.

FIG. 22 illustrates a schematic diagram of an exemplary environment 2200 in which the graphic design system 900, 1600, 2000 can operate in accordance with one or more embodiments. In one or more embodiments, the environment 2200 includes a service provider 2202 which may include one or more servers 2204 connected to a plurality of client devices 2206A-2206N via one or more networks 2208. The client devices 2206A-2206N, the one or more networks 2208, the service provider 2202, and the one or more servers 2204 may communicate with each other or other components using any communication platforms and technologies suitable for transporting data and/or communication signals, including any known communication technologies, devices, media, and protocols supportive of remote data communications, examples of which will be described in more detail below with respect to FIG. 23.

Although FIG. 22 illustrates a particular arrangement of the client devices 2206A-2206N, the one or more networks 2208, the service provider 2202, and the one or more servers 2204, various additional arrangements are possible. For example, the client devices 2206A-2206N may directly communicate with the one or more servers 2204, bypassing the network 2208. Or alternatively, the client devices 2206A-2206N may directly communicate with each other. The service provider 2202 may be a public cloud service provider which owns and operates their own infrastructure in one or more data centers and provides this infrastructure to customers and end users on demand to host applications on the one or more servers 2204. The servers may include one or more hardware servers (e.g., hosts), each with its own computing resources (e.g., processors, memory, disk space, networking bandwidth, etc.) which may be securely divided between multiple customers, each of which may host their own applications on the one or more servers 2204. In some embodiments, the service provider may be a private cloud provider which maintains cloud infrastructure for a single organization. The one or more servers 2204 may similarly include one or more hardware servers, each with its own computing resources, which are divided among applications hosted by the one or more servers for use by members of the organization or their customers.

Similarly, although the environment 2200 of FIG. 22 is depicted as having various components, the environment 2200 may have additional or alternative components. For example, the environment 2200 can be implemented on a single computing device with the graphic design system 900, 1600, 2000. In particular, the graphic design system 900, 1600, 2000 may be implemented in whole or in part on the client device 2202A.

As illustrated in FIG. 22, the environment 2200 may include client devices 2206A-2206N. The client devices 2206A-2206N may comprise any computing device. For example, client devices 2206A-2206N may comprise one or more personal computers, laptop computers, mobile devices, mobile phones, tablets, special purpose computers, TVs, or other computing devices, including computing devices described below with regard to FIG. 23. Although three client devices are shown in FIG. 22, it will be appreciated that client devices 2206A-2206N may comprise any number of client devices (greater or smaller than shown).

Moreover, as illustrated in FIG. 22, the client devices 2206A-2206N and the one or more servers 2204 may communicate via one or more networks 2208. The one or more networks 2208 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 2208 may be any suitable network over which the client devices 2206A-2206N may access service provider 2202 and server 2204, or vice versa. The one or more networks 2208 will be discussed in more detail below with regard to FIG. 23.

In addition, the environment 2200 may also include one or more servers 2204. The one or more servers 2204 may generate, store, receive, and transmit any type of data. For example, a server 2204 may receive data from a client device, such as the client device 2206A, and send the data to another client device, such as the client device 2202B and/or 2202N. The server 2204 can also transmit electronic messages between one or more users of the environment 2200. In one example embodiment, the server 2204 is a data server. The server 2204 can also comprise a communication server or a web-hosting server. Additional details regarding the server 2204 will be discussed below with respect to FIG. 23.

As mentioned, in one or more embodiments, the one or more servers 2204 can include or implement at least a portion of the graphic design system 900, 1600, 2000. In particular, the graphic design system 900, 1600, 2000 can comprise an application running on the one or more servers 2204 or a portion of the graphic design system 900, 1600, 2000 can be downloaded from the one or more servers 2204. For example, the graphic design system 900, 1600, 2000 can include a web hosting application that allows the client devices 2206A-2206N to interact with content hosted at the one or more servers 2204. To illustrate, in one or more embodiments of the environment 2200, one or more client devices 2206A-2206N can access a webpage supported by the one or more servers 2204. In particular, the client device 2206A can run a web application (e.g., a web browser) to allow a user to access, view, and/or interact with a webpage or website hosted at the one or more servers 2204.

Upon the client device 2206A accessing a webpage or other web application hosted at the one or more servers 2204, in one or more embodiments, the one or more servers 2204 can enable a user to open, edit, or create a document (e.g., a drawing file) stored at the one or more servers 2204. Moreover, the client device 2206A can receive a request (i.e., via user input) to add content to the document and provide the request to the one or more servers 2204. Upon receiving the request, the one or more servers 2204 can automatically perform the methods and processes described above to add content to the document. The one or more servers 2204 can update the document based on the new content and return the updated document to the client device 2206A for display to the user.

As just described, the graphic design system 900, 1600, 2000 may be implemented in whole, or in part, by the individual elements 2202-2208 of the environment 2200. It will be appreciated that although certain components of the graphic design system 900, 1600, 2000 are described in the previous examples with regard to particular elements of the environment 2200, various alternative implementations are possible. For instance, in one or more embodiments, the graphic design system 900, 1600, 2000 is implemented on any of the client devices 2206A-N. Similarly, in one or more embodiments, the graphic design system 900, 1600, 2000 may be implemented on the one or more servers 2204. Moreover, different components and functions of the graphic design system 900, 1600, 2000 may be implemented separately among client devices 2206A-2206N, the one or more servers 2204, and the network 2208.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 23:
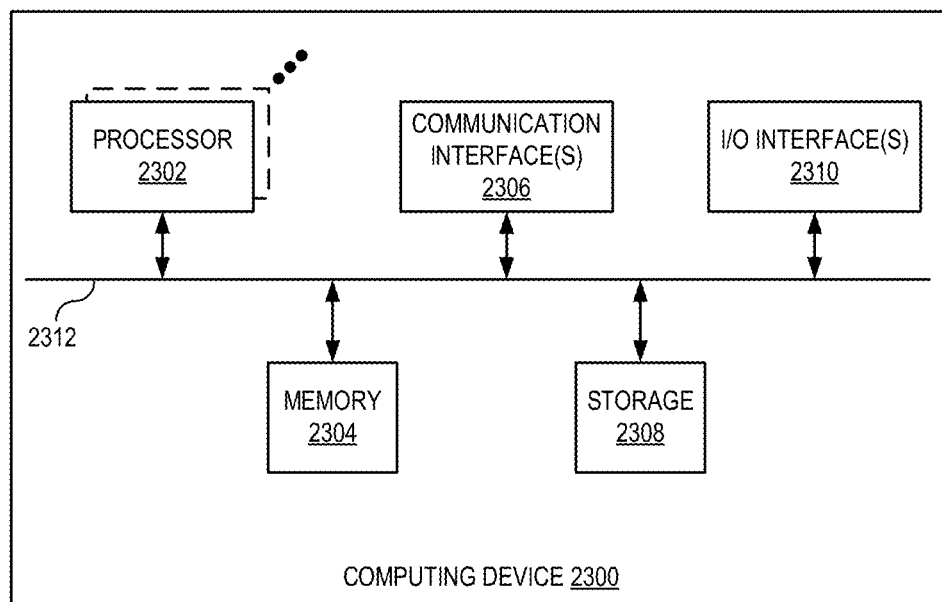
FIG. 23 illustrates a block diagram of an exemplary computing device in accordance with one or more embodiments.

FIG. 23 illustrates, in block diagram form, an exemplary computing device 2300 that may be configured to perform one or more of the processes described above. One will appreciate that one or more computing devices such as the computing device 2300 may implement the image processing system. As shown by FIG. 23, the computing device can comprise a processor 2302, memory 2304, one or more communication interfaces 2306, a storage device 2308, and one or more I/O devices/interfaces 2310. In certain embodiments, the computing device 2300 can include fewer or more components than those shown in FIG. 23. Components of computing device 2300 shown in FIG. 23 will now be described in additional detail.

In particular embodiments, processor(s) 2302 includes hardware for executing instructions, such as those making up a computer program. As an example, and not by way of limitation, to execute instructions, processor(s) 2302 may retrieve (or fetch) the instructions from an internal register, an internal cache, memory 2304, or a storage device 2308 and decode and execute them. In various embodiments, the processor(s) 2302 may include one or more central processing units (CPUs), graphics processing units (GPUs), field programmable gate arrays (FPGAs), systems on chip (SoC), or other processor(s) or combinations of processors.

The computing device 2300 includes memory 2304, which is coupled to the processor(s) 2302. The memory 2304 may be used for storing data, metadata, and programs for execution by the processor(s). The memory 2304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2304 may be internal or distributed memory.

The computing device 2300 can further include one or more communication interfaces 2306. A communication interface 2306 can include hardware, software, or both. The communication interface 2306 can provide one or more interfaces for communication (such as, for example, packet-based communication) between the computing device and one or more other computing devices 2300 or one or more networks. As an example and not by way of limitation, communication interface 2306 may include a network interface controller (NIC) or network adapter for communicating with an Ethernet or other wire-based network or a wireless NIC (WNIC) or wireless adapter for communicating with a wireless network, such as a WI-FI. The computing device 2300 can further include a bus 2312. The bus 2312 can comprise hardware, software, or both that couples components of computing device 2300 to each other.

The computing device 2300 includes a storage device 2308 includes storage for storing data or instructions. As an example, and not by way of limitation, storage device 2308 can comprise a non-transitory storage medium described above. The storage device 2308 may include a hard disk drive (HDD), flash memory, a Universal Serial Bus (USB) drive or a combination these or other storage devices. The computing device 2300 also includes one or more input or output ("I/O") devices/interfaces 2310, which are provided to allow a user to provide input to (such as user strokes), receive output from, and otherwise transfer data to and from the computing device 2300. These I/O devices/interfaces 2310 may include a mouse, keypad or a keyboard, a touch screen, camera, optical scanner, network interface, modem, other known I/O devices or a combination of such I/O devices/interfaces 2310. The touch screen may be activated with a stylus or a finger.

The I/O devices/interfaces 2310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 2310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method, comprising:
obtaining a document including a digital canvas;
identifying a plurality of layers associated with the digital canvas, wherein each layer of the plurality of layers organizes content in the digital canvas based on a semantic knowledge of the content and a semantic knowledge of content of one or more other layers of the digital canvas;
determining a plurality of semantic labels associated with the plurality of layers;
determining a semantic layer hierarchy of the plurality of layers;
generating, using one or more machine learning models, content of the digital canvas, wherein the content is a digital object depicted in the digital canvas and associated with a content type and a location in the digital canvas;
adding the generated content to a new layer of the digital canvas;
updating the semantic layer hierarchy by adding the new layer to the semantic layer hierarchy; and
organizing the plurality of layers based at least on the semantic layer hierarchy.

2. The method of claim 1, wherein determining a semantic layer hierarchy of the plurality of layers, further comprises:
determining semantic relationships between the plurality of layers based on the plurality of semantic labels.

3. The method of claim 1, wherein organizing the plurality of layers based at least on the semantic layer hierarchy, further comprises:
identifying semantically similar layers based on their corresponding semantic labels; and
creating a group of layers that includes the semantically similar layers, each group associated with a group label.

4. The method of claim 3, further comprising:
identifying semantically similar groups based on their corresponding group labels; and
creating a group of groups that includes the semantically similar groups.

5. The method of claim 1, wherein organizing the plurality of layers based at least on the semantic layer hierarchy, further comprises:
determining a z-order of the plurality of layers based on the semantic layer hierarchy; and
storing the z-order in the semantic layer hierarchy.

6. The method of claim 1, further comprising:
receiving a user selection of a content type to be generated;
receiving a user selection of a location in the digital canvas to place content of the content type;
generating, using the one or more machine learning models, content of the selected content type at the location in the digital canvas; and
adding the content to a new layer of the digital canvas, wherein the new layer is associated with a semantic label corresponding to the content type.

7. The method of claim 1, wherein determining a plurality of semantic labels associated with the plurality of layers, further comprises:
annotating, by a machine learning model trained to generate a semantic label for content associated with a layer, each layer of the plurality of layers with its corresponding semantic label.

8. A non-transitory computer readable storage medium including instructions stored thereon which, when executed by at least one processor, cause the at least one processor to:
obtain a document including a digital canvas;
identify a plurality of layers associated with the digital canvas, wherein each layer of the plurality of layers organizes content in the digital canvas based on a semantic knowledge of the content and a semantic knowledge of content of one or more other layers of the digital canvas;
determine a plurality of semantic labels associated with the plurality of layers;
determine a semantic layer hierarchy of the plurality of layers;
generate, using one or more machine learning models, content of the digital canvas, wherein the content is a digital object depicted in the digital canvas and associated with a content type and a location in the digital canvas;
add the generated content to a new layer of the digital canvas;
update the semantic layer hierarchy by adding the new layer to the semantic layer hierarchy; and
organize the plurality of layers based at least on the semantic layer hierarchy.

9. The non-transitory computer readable storage medium of claim 8, wherein to determine a semantic layer hierarchy of the plurality of layers, the instructions, when executed, further cause the at least one processor to:
determine semantic relationships between the plurality of layers based on the plurality of semantic labels.

10. The non-transitory computer readable storage medium of claim 8, wherein to organize the plurality of layers based at least on the semantic layer hierarchy, the instructions, when executed, further cause the at least one processor to:
identify semantically similar layers based on their corresponding semantic labels; and
create a group of layers that includes the semantically similar layers, each group associated with a group label.

11. The non-transitory computer readable storage medium of claim 10, wherein the instructions, when executed, further cause the at least one processor to:
identify semantically similar groups based on their corresponding group labels; and
create a group of groups that includes the semantically similar groups.

12. The non-transitory computer readable storage medium of claim 8, wherein to organize the plurality of layers based at least on the semantic layer hierarchy, the instructions, when executed, further cause the at least one processor to:
determine a z-order of the plurality of layers based on the semantic layer hierarchy; and
store the z-order in the semantic layer hierarchy.

13. The non-transitory computer readable storage medium of claim 8, wherein the instructions, when executed, further cause the at least one processor to:
receive a user selection of a content type to be generated;
receive a user selection of a location in the digital canvas to place content of the content type;
generate, using the one or more machine learning models, content of the selected content type at the location in the digital canvas; and
add the content to a new layer of the digital canvas, wherein the new layer is associated with a semantic label corresponding to the content type.

14. The non-transitory computer readable storage medium of claim 8, wherein to determine a plurality of semantic labels associated with the plurality of layers, the instructions, when executed, further cause the at least one processor to:
annotate, by a machine learning model trained to generate a semantic label for content associated with a layer, each layer of the plurality of layers with its corresponding semantic label.

15. A graphic design system, comprising:
at least one processor; and
a memory including instructions stored thereon which, when executed by the at least one processor, cause the graphic design system to:
obtain a document including a digital canvas;
identify a plurality of layers associated with the digital canvas, wherein each layer of the plurality of layers organizes content in the digital canvas based on a semantic knowledge of the content and a semantic knowledge of content of one or more other layers of the digital canvas;
determine a plurality of semantic labels associated with the plurality of layers;
determine a semantic layer hierarchy of the plurality of layers;
generate, using one or more machine learning models, content of the digital canvas, wherein the content is a digital object depicted in the digital canvas and associated with a content type and a location in the digital canvas;
add the generated content to a new layer of the digital canvas;
update the semantic layer hierarchy by adding the new layer to the semantic layer hierarchy; and
organize the plurality of layers based at least on the semantic layer hierarchy.

16. The graphic design system of claim 15, wherein to determine a semantic layer hierarchy of the plurality of layers, the instructions, when executed, further cause the graphic design system to:
determine semantic relationships between the plurality of layers based on the plurality of semantic labels.

17. The graphic design system of claim 15, wherein to organize the plurality of layers based at least on the semantic layer hierarchy, the instructions, when executed, further cause the graphic design system to:
identify semantically similar layers based on their corresponding semantic labels; and create a group of layers that includes the semantically similar layers, each group associated with a group label.

18. The graphic design system of claim 17, wherein the instructions, when executed, further cause the graphic design system to:
identify semantically similar groups based on their corresponding group labels; and
create a group of groups that includes the semantically similar groups.

19. The method of claim 3, wherein the group of layers is assigned a content rule based on the semantic labels included in the group of layers, wherein the content rule defines a size rule, an alignment rule, or an orientation rule for the group of layers.

20. The non-transitory computer readable storage medium of claim 10, wherein the group of layers is assigned a content rule based on the semantic labels included in the group of layers, wherein the content rule defines a size rule, an alignment rule, or an orientation rule for the group of layers.

\* \* \* \* \*